(12) United States Patent
Norton et al.

(10) Patent No.: US 11,002,438 B2
(45) Date of Patent: May 11, 2021

(54) ADJUSTABLE CLIP-ON BASE FOR LED ASSEMBLY

(71) Applicants: Sidney Howard Norton, Odessa, TX (US); Curtis Alan Roys, Fredericksburg, TX (US)

(72) Inventors: Sidney Howard Norton, Odessa, TX (US); Curtis Alan Roys, Fredericksburg, TX (US)

( * ) Notice: Subject to any disclaimer, the term of this patent is extended or adjusted under 35 U.S.C. 154(b) by 0 days.

(21) Appl. No.: 16/839,704

(22) Filed: Apr. 3, 2020

(65) Prior Publication Data

US 2020/0318820 A1 Oct. 8, 2020

Related U.S. Application Data

(60) Provisional application No. 62/829,022, filed on Apr. 3, 2019.

(51) Int. Cl.
*F21V 21/14* (2006.01)
*F21V 21/088* (2006.01)
*F16M 13/02* (2006.01)
*F21K 9/27* (2016.01)

(52) U.S. Cl.
CPC .............. *F21V 21/14* (2013.01); *F16M 13/02* (2013.01); *F21V 21/088* (2013.01); *F21K 9/27* (2016.08)

(58) Field of Classification Search
CPC ........ F21V 21/14; F21V 21/088; F21V 21/34; F21V 21/00; F21V 21/08; F21V 19/02; F21V 19/00; F21V 21/0885; F21V 21/35; F21V 19/001; F21V 19/0015; F21V 19/003; F21V 19/0035; F21V 19/004; F21V 19/04; F21V 19/047; F16M 13/02; F16M 13/00; F21K 9/27
See application file for complete search history.

(56) References Cited

U.S. PATENT DOCUMENTS

| 799,065 A | 9/1905 | Kronstein |
| 3,883,926 A | 5/1975 | Reynolds |
| 3,894,225 A | 7/1975 | Chao |

(Continued)

FOREIGN PATENT DOCUMENTS

| CN | 201487639 U | 5/2010 |
| CN | 202901882 U | 4/2013 |

(Continued)

OTHER PUBLICATIONS

U.S. Appl. No. 29/639,296, filed Mar. 5, 2018, Curtis Alan Roys.

*Primary Examiner* — Bao Q Truong
(74) *Attorney, Agent, or Firm* — Scheinberg & Associates, PC; Michael O. Scheinberg

(57) ABSTRACT

An adjustable clip-on base for installing an LED support into a lighting enclosure includes a support clip portion for removably attaching the adjustable clip-on base onto the LED support. The adjustable clip-on based also includes a mating structure portion configured for mating with the lighting enclosure to mount the LED support into the lighting enclosure. The support clip being is positionable on the LED support over a range of positions to alter the distance that the mating structure portion extends from the end of the LED support so that the combined length of the adjustable clip-on base and the LED support can be adjusted to fit in the lighting enclosure.

22 Claims, 25 Drawing Sheets

(56) References Cited

U.S. PATENT DOCUMENTS

| | | |
|---|---|---|
| 4,023,758 A | 5/1977 | Yuda |
| 4,173,035 A | 10/1979 | Hoyt |
| 4,439,818 A | 3/1984 | Scheib |
| 5,288,047 A | 2/1994 | Pan |
| 5,331,512 A | 7/1994 | Orton |
| 5,559,681 A | 9/1996 | Duarte |
| 5,688,042 A | 11/1997 | Madadi et al. |
| 5,707,136 A | 1/1998 | Byers |
| 6,056,418 A | 5/2000 | Hsu |
| 6,109,765 A | 8/2000 | Blanton |
| 6,210,019 B1 | 4/2001 | Weathers |
| 6,216,987 B1 | 4/2001 | Fukuo |
| 6,267,342 B1 | 7/2001 | Huang |
| D477,093 S | 7/2003 | Moriyama et al. |
| 6,685,385 B1 | 2/2004 | Ledingham |
| D506,274 S | 6/2005 | Moriyama et al. |
| 7,052,171 B1 | 5/2006 | Lefebvre et al. |
| 7,213,941 B2 | 5/2007 | Sloan et al. |
| D584,429 S | 1/2009 | Pei et al. |
| 7,478,924 B2 | 1/2009 | Robertson |
| 7,488,086 B2 | 2/2009 | Wu et al. |
| D594,999 S | 6/2009 | Uchida et al. |
| D601,726 S | 10/2009 | Mollaert et al. |
| D610,724 S | 2/2010 | Chiang et al. |
| 7,744,266 B2 | 6/2010 | Higley et al. |
| 7,784,745 B2 | 8/2010 | Dodge |
| 7,976,196 B2 | 7/2011 | Ivey et al. |
| D649,682 S | 11/2011 | Trzesniowski |
| D649,683 S | 11/2011 | Trzesniowski |
| D649,692 S | 11/2011 | Trzesniowski |
| 8,075,167 B2 | 12/2011 | Shin |
| D652,568 S | 1/2012 | Trzesniowski |
| D652,985 S | 1/2012 | Trzesniowski |
| D652,986 S | 1/2012 | Trzesniowski |
| D663,048 S | 7/2012 | Chen |
| 8,232,713 B2 | 7/2012 | Li et al. |
| D665,518 S | 8/2012 | Takahashi et al. |
| D666,328 S | 8/2012 | Morton |
| 8,240,894 B2 | 8/2012 | Sanroma et al. |
| D673,307 S | 12/2012 | Moghal |
| 8,328,386 B2 | 12/2012 | Catalano et al. |
| 8,419,223 B2 | 4/2013 | Withers |
| 8,434,914 B2 | 5/2013 | Li et al. |
| 8,449,145 B1 | 5/2013 | Berry et al. |
| 8,474,998 B2 | 7/2013 | Wang et al. |
| 8,573,813 B2 | 11/2013 | Ivey et al. |
| D695,955 S | 12/2013 | Klus |
| 8,636,391 B2 | 1/2014 | Dellian et al. |
| D715,461 S | 10/2014 | Chen |
| D724,257 S | 3/2015 | Klus |
| D724,259 S | 3/2015 | Klus |
| D724,260 S | 3/2015 | Klus |
| D775,409 S | 12/2016 | Klus |
| D775,410 S | 12/2016 | Klus |
| D792,017 S | 7/2017 | Klus |
| D796,110 S | 8/2017 | Klus |
| D798,471 S | 9/2017 | Tremaine et al. |
| D799,065 S | 10/2017 | Tremaine et al. |
| D802,176 S | 11/2017 | Tan et al. |
| 9,651,054 B2 | 12/2017 | Vincent |
| D807,572 S | 1/2018 | Klus |
| D809,704 S | 2/2018 | Klus |
| D811,627 S | 2/2018 | Roys |
| D818,187 S | 5/2018 | Trzesniowski |
| D818,188 S | 5/2018 | Trzesniowski |
| D818,189 S | 5/2018 | Trzesniowski |
| D818,194 S | 5/2018 | Trzesniowski |
| D831,465 S | 10/2018 | MacDonald et al. |
| D834,398 S | 11/2018 | MacDonald et al. |
| D834,399 S | 11/2018 | MacDonald et al. |
| 10,222,005 B2 | 3/2019 | Norton et al. |
| D845,516 S | 4/2019 | Yuan |
| D847,412 S | 4/2019 | Trzcieliński |
| D868,353 S | 11/2019 | Trzcieliński |
| D868,355 S | 11/2019 | Trzcieliński |
| 10,488,020 B2 | 11/2019 | Zanotto et al. |
| D869,070 S | 12/2019 | Trzcieliński |
| D869,071 S | 12/2019 | Trzcieliński |
| D869,072 S | 12/2019 | Trzcielinski |
| D869,073 S | 12/2019 | Trzcielinski |
| D869,074 S | 12/2019 | Trzcieliński |
| D869,077 S | 12/2019 | Trzcieliński |
| D869,078 S | 12/2019 | Trzcieliński |
| D869,080 S | 12/2019 | Trzcielinski |
| D869,081 S | 12/2019 | Trzcielinski |
| D876,001 S | 2/2020 | Sugiyama et al. |
| D876,714 S | 2/2020 | Klus |
| D877,402 S | 3/2020 | Klus |
| 2004/0056600 A1 | 3/2004 | Lapatovich et al. |
| 2004/0062041 A1 | 4/2004 | Cross et al. |
| 2005/0185396 A1 | 8/2005 | Kutler |
| 2006/0039142 A1 | 2/2006 | Temple |
| 2007/0242466 A1 | 10/2007 | Wu et al. |
| 2008/0158858 A1 | 7/2008 | Madireddi et al. |
| 2009/0027916 A1 | 1/2009 | Huang et al. |
| 2009/0073693 A1 | 3/2009 | Nall et al. |
| 2009/0091929 A1 | 4/2009 | Faubion |
| 2009/0121988 A1 | 5/2009 | Amo et al. |
| 2009/0146910 A1 | 6/2009 | Gardner |
| 2009/0296381 A1 | 12/2009 | Dubord |
| 2010/0008085 A1 | 1/2010 | Ivey et al. |
| 2010/0102730 A1 | 4/2010 | Simon et al. |
| 2010/0135020 A1 | 6/2010 | Moore |
| 2011/0019413 A1 | 1/2011 | Zimmerman et al. |
| 2011/0058357 A1 | 3/2011 | Anderson |
| 2011/0058377 A1 | 3/2011 | Chou et al. |
| 2011/0134640 A1 | 6/2011 | Bertele |
| 2011/0235319 A1 | 9/2011 | Fukano et al. |
| 2012/0008316 A1 | 1/2012 | Ivey |
| 2012/0074831 A1 | 3/2012 | Li et al. |
| 2012/0124874 A1 | 5/2012 | Breihof |
| 2012/0161666 A1 | 6/2012 | Antony et al. |
| 2012/0298813 A1 | 11/2012 | Gibbons et al. |
| 2013/0333197 A1 | 12/2013 | Schulte et al. |
| 2014/0153231 A1 | 6/2014 | Bittmann |
| 2014/0160742 A1 | 6/2014 | Rodgers et al. |
| 2014/0301069 A1 | 10/2014 | Hwu et al. |
| 2014/0334142 A1 | 11/2014 | Levante et al. |
| 2015/0016099 A1 | 1/2015 | Khanampornpan |
| 2015/0092413 A1 | 4/2015 | Li et al. |
| 2015/0144760 A1 | 5/2015 | Paradiso |
| 2015/0184838 A1 | 7/2015 | Li et al. |
| 2015/0292681 A1* | 10/2015 | Liang .................... F21V 19/003 362/222 |
| 2015/0308631 A1 | 10/2015 | Gorman et al. |
| 2016/0018062 A1 | 1/2016 | Zhang et al. |
| 2017/0023186 A1 | 1/2017 | Norton et al. |
| 2017/0030530 A1 | 2/2017 | Roys |
| 2017/0051882 A1 | 2/2017 | Engel et al. |
| 2019/0338897 A1* | 11/2019 | Brown .................... F21V 5/04 |

FOREIGN PATENT DOCUMENTS

| | | |
|---|---|---|
| CN | 202915096 U | 5/2013 |
| CN | 103542273 A | 1/2014 |
| DE | 29616093 U1 | 10/1996 |
| DE | 102009023055 A1 | 12/2010 |
| DE | 202012102037 U1 | 7/2012 |
| DE | 102012211934 A1 | 1/2014 |
| DE | 102014214603 A1 | 1/2016 |
| EP | 1931006 A1 | 6/2008 |
| EP | 2554895 A4 | 3/2014 |
| EP | 3009732 A1 | 4/2016 |
| JP | 2009116418 A | 5/2009 |
| JP | 2010123097 A | 6/2010 |
| JP | 2012156056 A | 8/2012 |
| KR | 1020130068957 | 6/2013 |
| WO | 2011122518 A1 | 10/2011 |
| WO | 2013082523 A1 | 6/2013 |
| WO | 2013104624 A1 | 7/2013 |
| WO | 2014048677 A1 | 4/2014 |
| WO | 2014202361 A1 | 12/2014 |
| WO | 2015120929 A1 | 8/2015 |

(56) References Cited

FOREIGN PATENT DOCUMENTS

| WO | 2016012124 A1 | 1/2016 |
|----|---------------|--------|
| WO | 2016012189 A1 | 1/2016 |
| WO | 2017019644 A1 | 2/2017 |

* cited by examiner

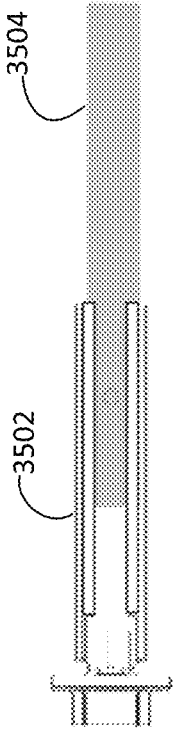
FIG. 35B
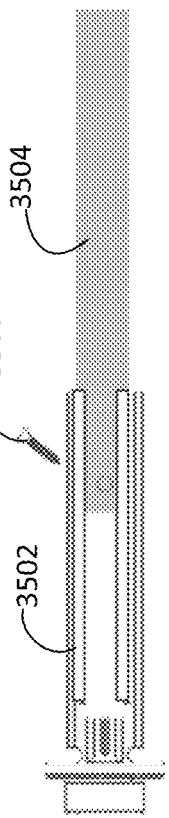
Can be used with or this out screw
FIG. 35D
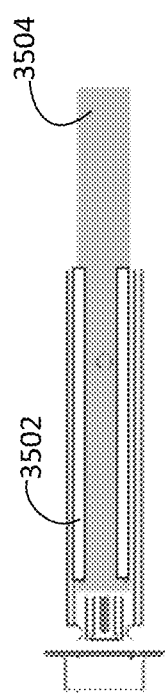
FIG. 35A
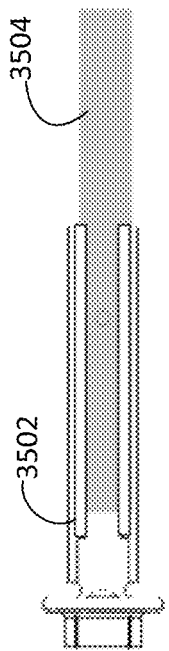
FIG. 35C
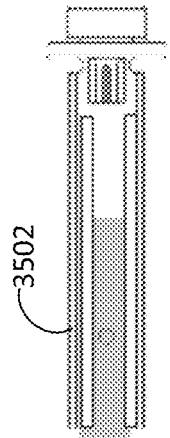
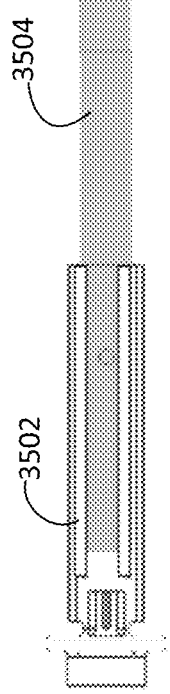
Both end can be adjusted    FIG. 35E

ADJUSTABLE CLIP-ON BASE FOR LED ASSEMBLY

This application claims priority from U.S. Prov. Pat. App. 62/829,022, file Apr. 3, 2019, which is hereby incorporated by reference.

TECHNICAL FIELD OF THE INVENTION

The present invention relates to the field of lighting systems, and in particular to apparatus and methods placement of light-emitting diode (LED) lights.

BACKGROUND OF THE INVENTION

Fluorescent lights are low pressure mercury-vapor gas-discharge lamps that use fluorescence to produce visible light. An electric current in the gas excites mercury vapor which produces short-wave ultraviolet light that then causes a light-emitting phosphor coating on the inside of the bulb to glow. Incandescent lights are electrical lights which produce light with a wire filament heated to a high temperature by an electric current passing through it until it glows.

Fluorescent lights are often used as back lighting for signs and are also found in residences, such as in kitchens, basements, or garages, in schools and in businesses because the electrical power cost savings when using fluorescent lamps tend to be significant when compared to incandescent light use. However, recent developments in light emitting diode (LED) technology have made LEDs more efficient and cheaper to use than either fluorescent or incandescent lights. LEDs are a type of solid-state lighting, using a semiconductor to convert electricity directly into light. LEDs have many advantages over incandescent light sources and fluorescent light sources including lower energy consumption, longer lifetimes, emitting an intended color without using any color filters, higher shock resistance, smaller size, and faster switching. LEDs are also more environmentally friendly in disposal after use than fluorescent lights since they do not contain mercury, a hazardous chemical.

U.S. Pat. No. 10,222,005 for "Method and assembly for replacing fluorescent lights" to the inventors of the present application describes a method for retrofitting LEDs into a fluorescent light cabinet. One described method entails accurately cutting a material, such as square aluminum tubing, to a specific length to form an LED support. LEDs are attached to the support material, and end caps, which are designed to fit into the existing fluorescent light fixtures or into a hole in the cabinet, are placed on the ends of the LED support. The assembly is installed into the fixtures or a hole in the light cabinet. If the material is cut too short, the end caps will not sufficiently engage the fluorescent light fixtures, and the LED assembly will fall out of the cabinet when elevated wind gust shake the cabinet. If the LED support material is cut too short the LED support cannot be installed due to the length of material. If the LED support material is cut too short the support material must be thrown away and causes financial loss to companies around the world. If the material is cut too long, the LED assembly will not fit in the cabinet.

Since manufacturers employees continue to make mistakes when cutting the LED support material, it would be extremely advantageous to enable the installation of LED lights to replace fluorescent lights in pre-existing light fixtures while reducing the precision required in cutting the LED support to length.

SUMMARY OF THE INVENTION

An object of the invention is to provide an adjustable clip-on base for mounting an LED assembly into a lighting enclosure.

A adjustable clip-on base for installing an LED support into a lighting enclosure, includes a support clip portion for removably attaching the adjustable clip-on base onto an LED support, the support clip portion being attachable to the LED support over a range of positions; and a mating structure portion extending from the support clip, the mating structure portion configured for mating with the lighting enclosure to mount the LED support into the lighting enclosure, the support clip being re-positionable over the range of positions to alter the distance that the mating structure portion extends from the end of the LED support.

The adjustable clip-on base allows an adjustment of the overall length of the LED assembly to compensate for variations in the length of the cut LED support material or of the dimensions of the lighting enclosure. Different mating structure portions in various embodiments can mate with any type of fitting or hole in the lighting enclosure, or onto a wall of the disclosure.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

For a more thorough understanding of the present invention, and advantages thereof, reference is now made to the following descriptions taken in conjunction with the accompanying drawings, in which:

FIGS. 35A-35D show an adjustable clip-on base positioned at different positions along an LED support. FIG. 35E shows an LED support with an adjustable clip-on base positioned at each end.

DETAILED DESCRIPTION OF PREFERRED EMBODIMENTS

Figure 1A:
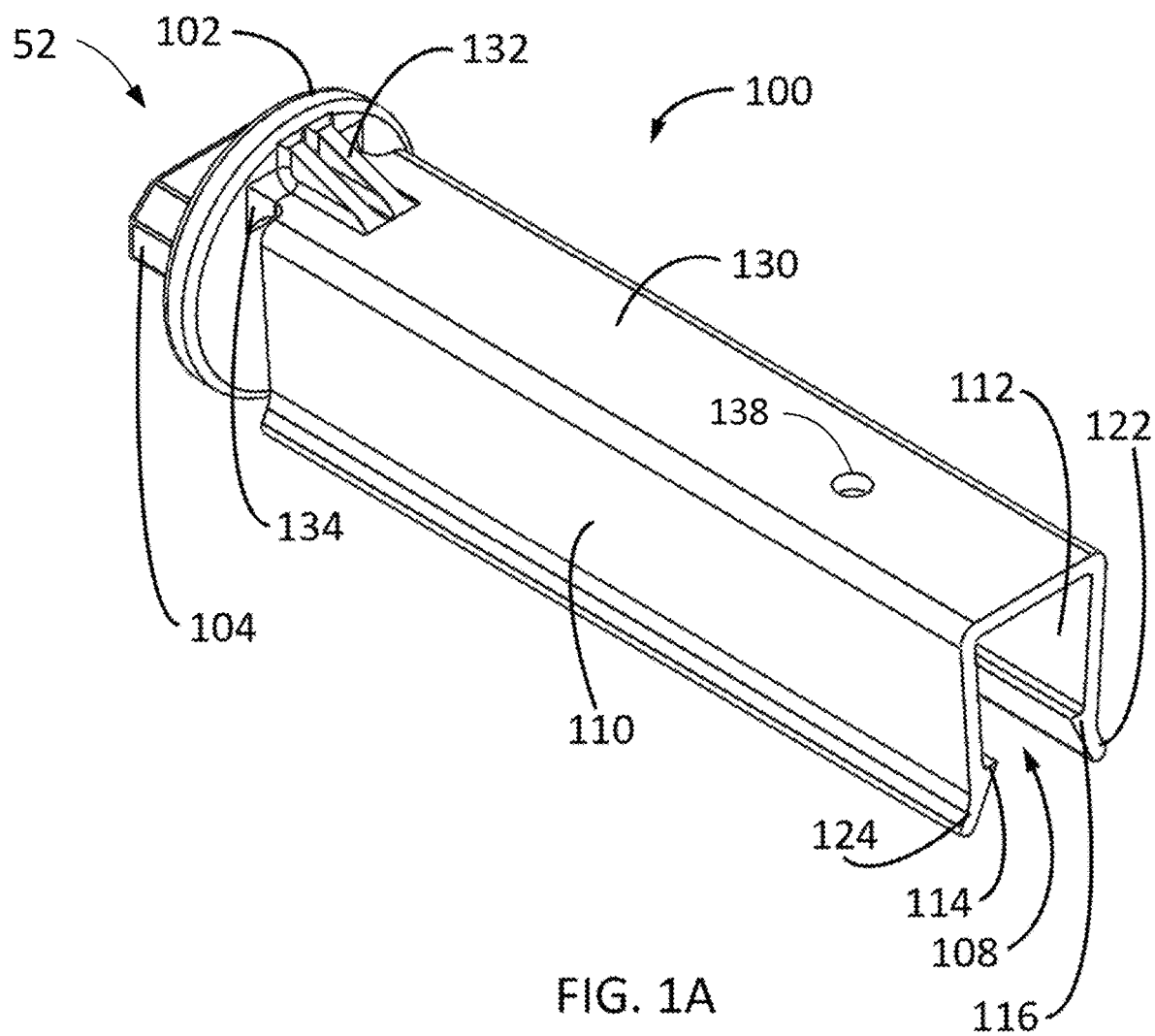
FIGS. 1A and 1B show isometric views of an adjustable clip-on base in accordance with a first embodiment.
Figure 1B:
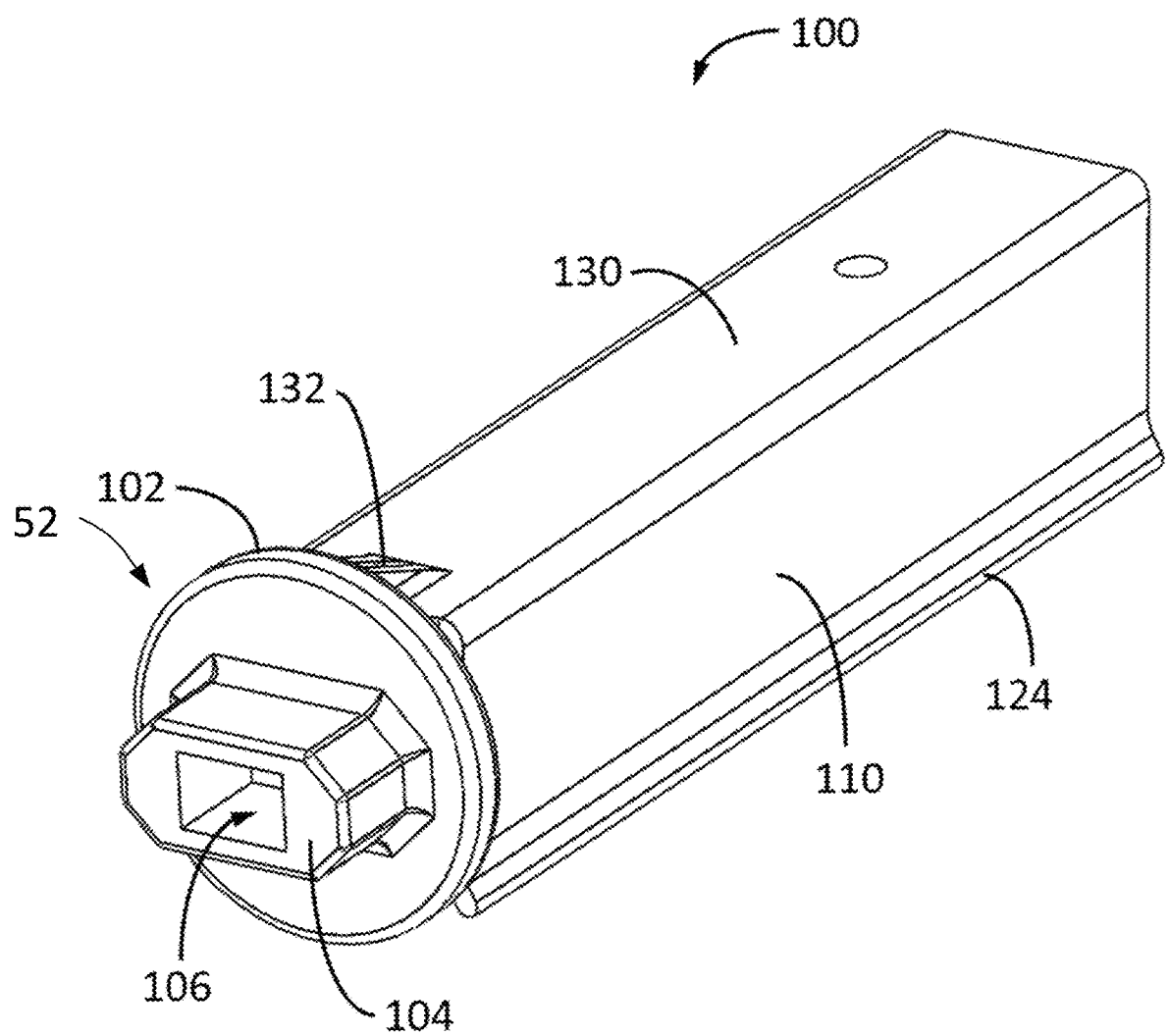
Figure 2:
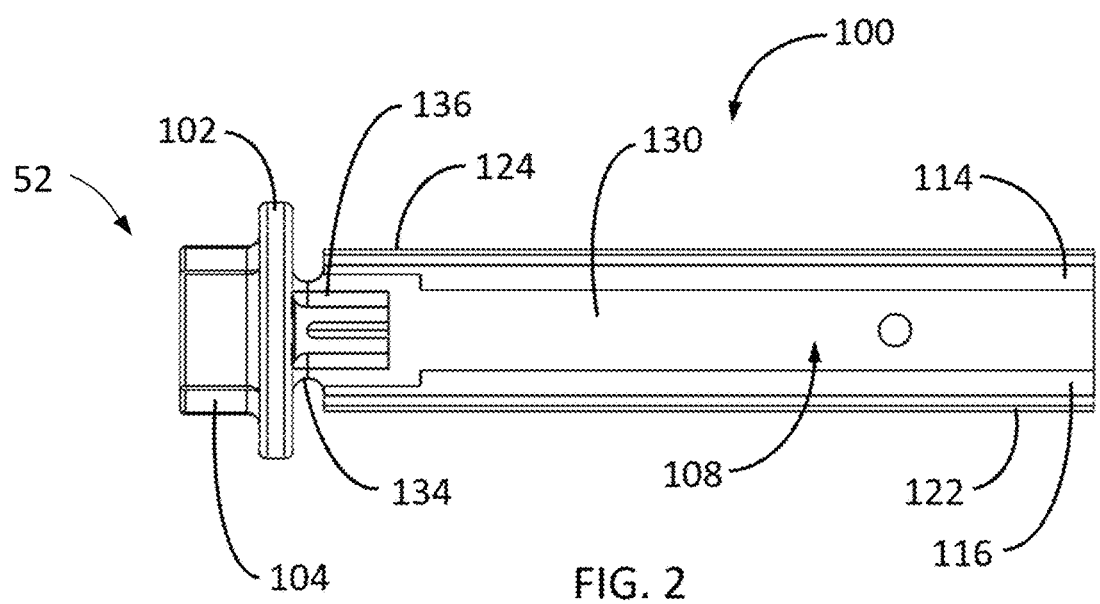
FIG. 2 shows a bottom view of the adjustable clip-on base in FIG. 1.
Figure 3:
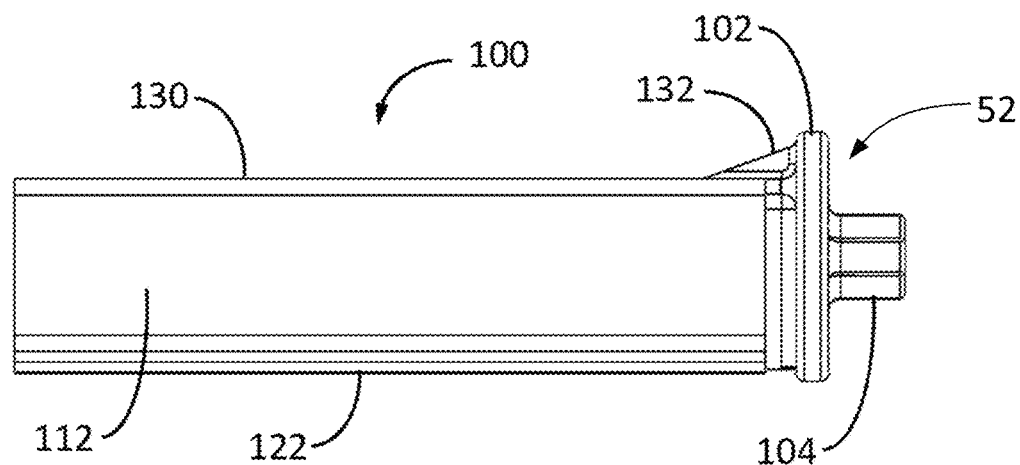
FIG. 3 shows a back view of the adjustable clip-on base in FIG. 1.
Figure 4:
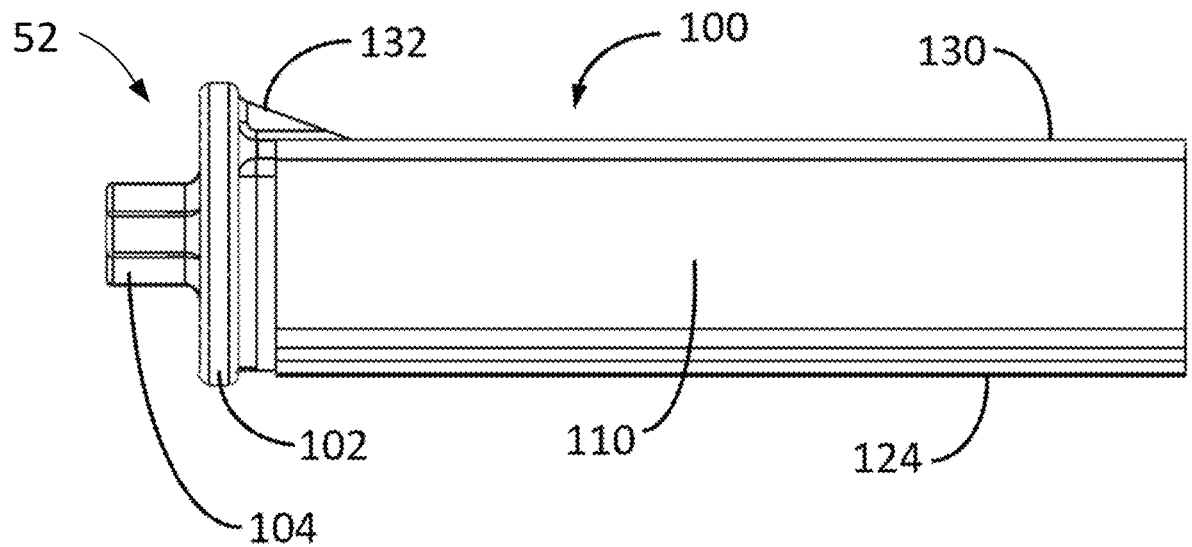
FIG. 4 shows a front view of the adjustable clip-on base in FIG. 1.
Figure 5:
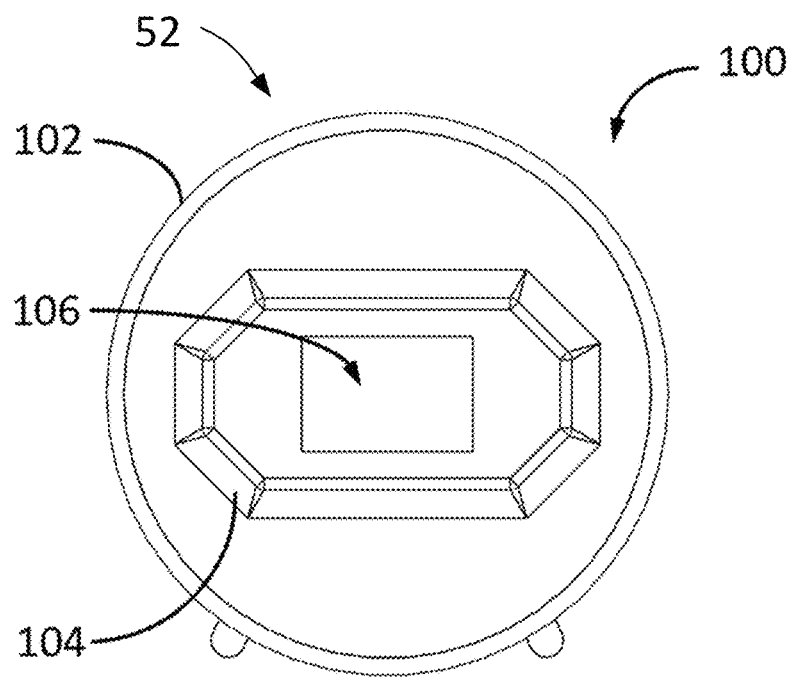
FIG. 5 shows a left side view of the adjustable clip-on base in FIG. 1.
Figure 6:
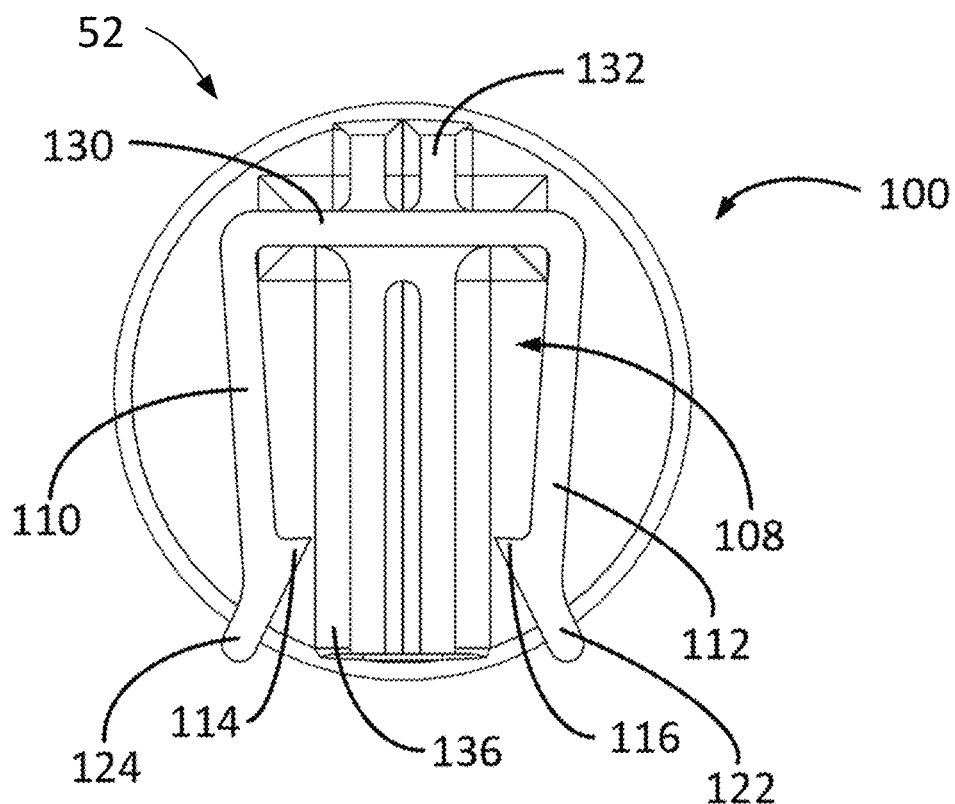
FIG. 6 shows a right side view of the adjustable clip-on base in FIG. 1.
Figure 7:
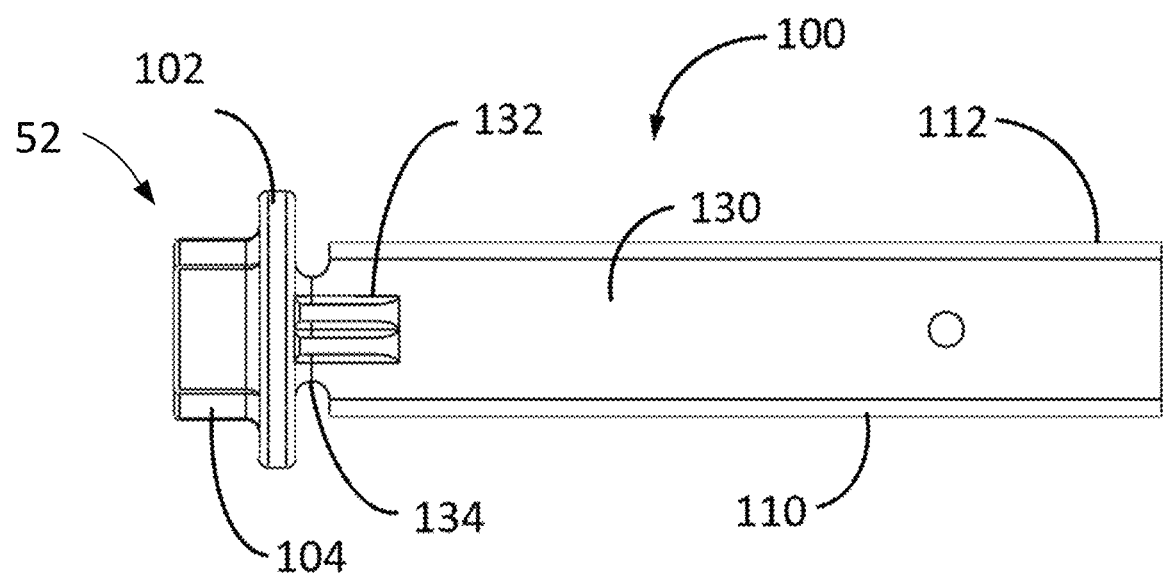
FIG. 7 shows a top view of the adjustable clip-on base in FIG. 1.
Figure 8A:
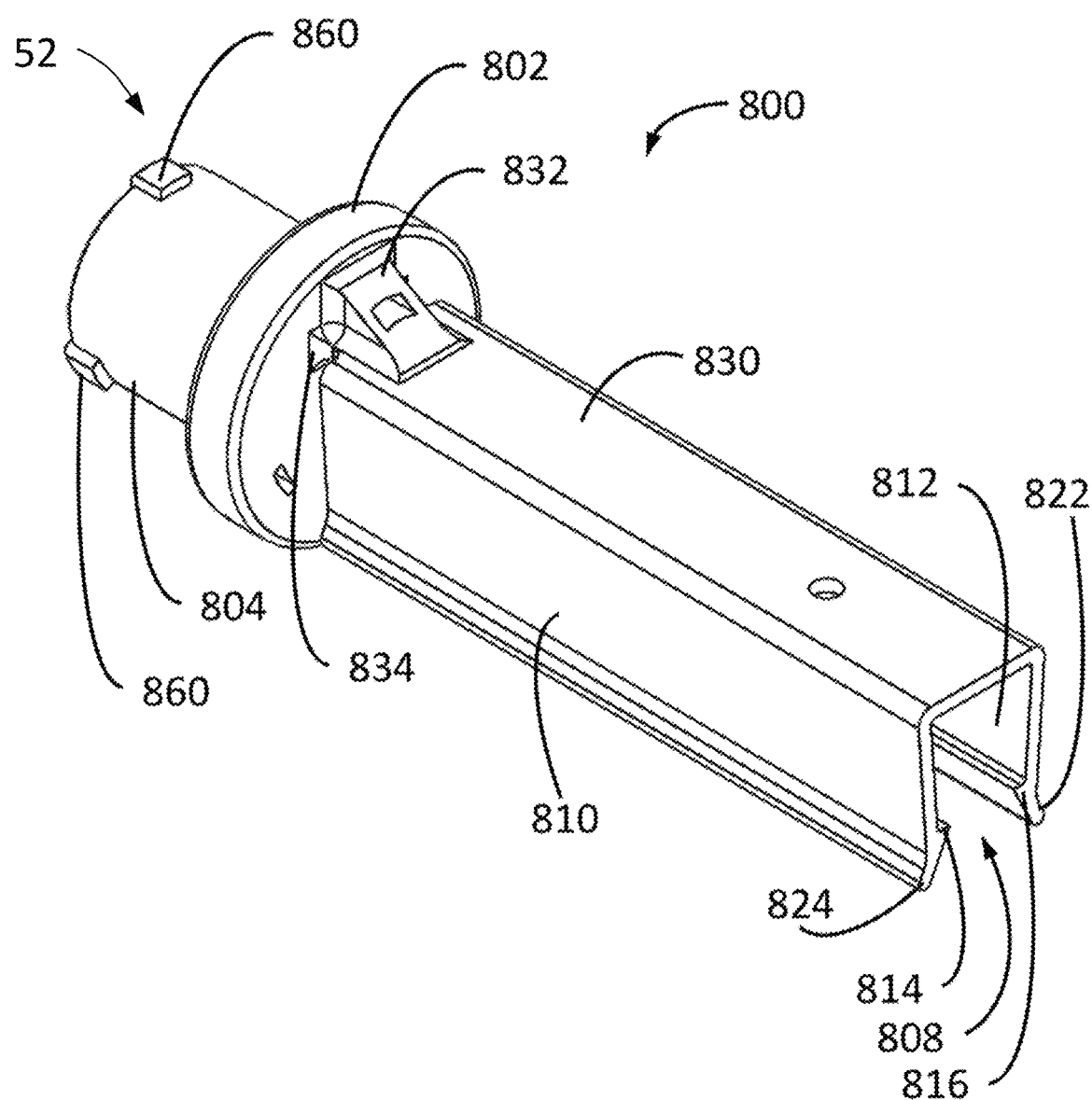
FIGS. 8A and 8B show isometric views of an adjustable clip-on base in accordance with a second embodiment.
Figure 8B:
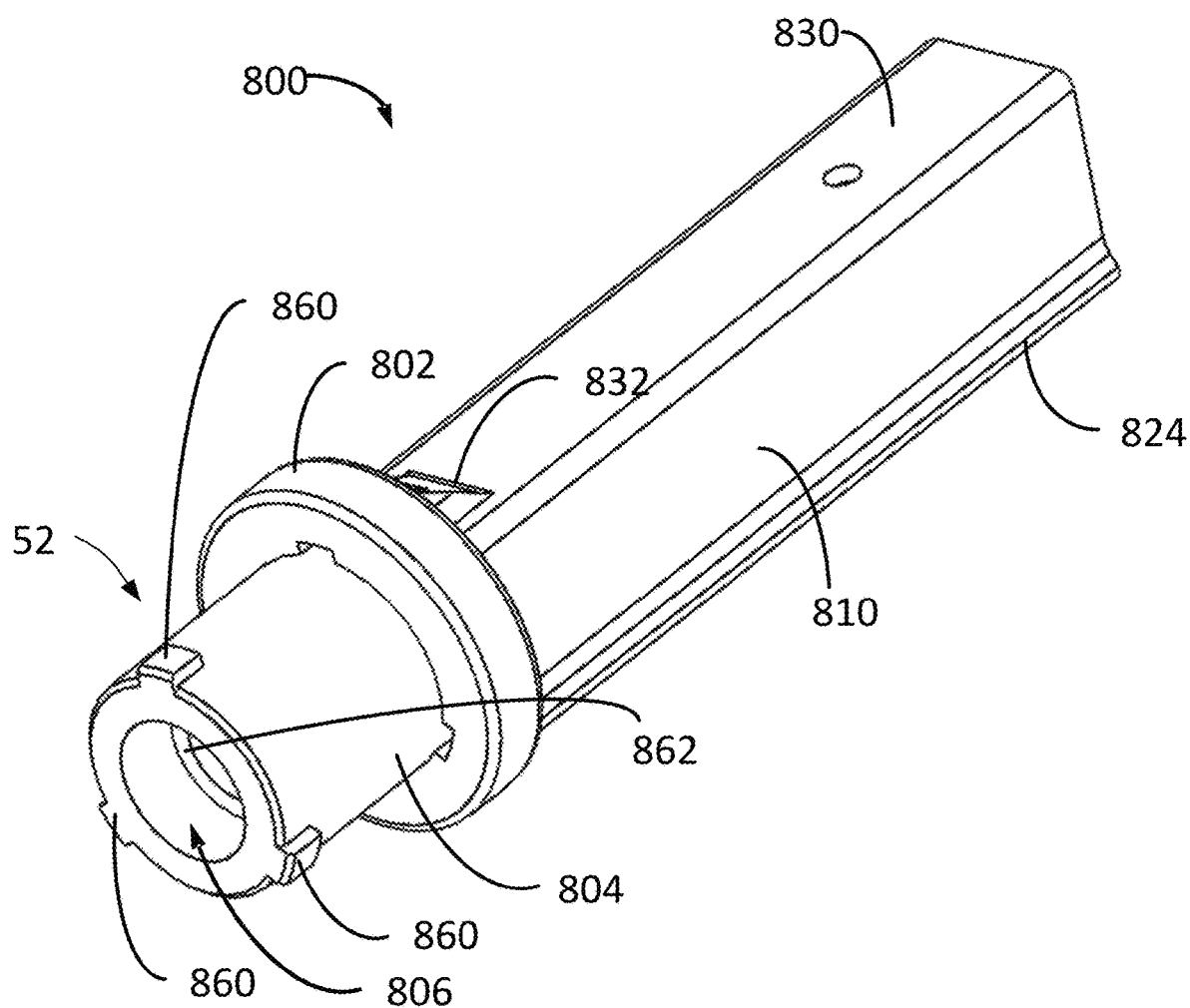
Figure 9:
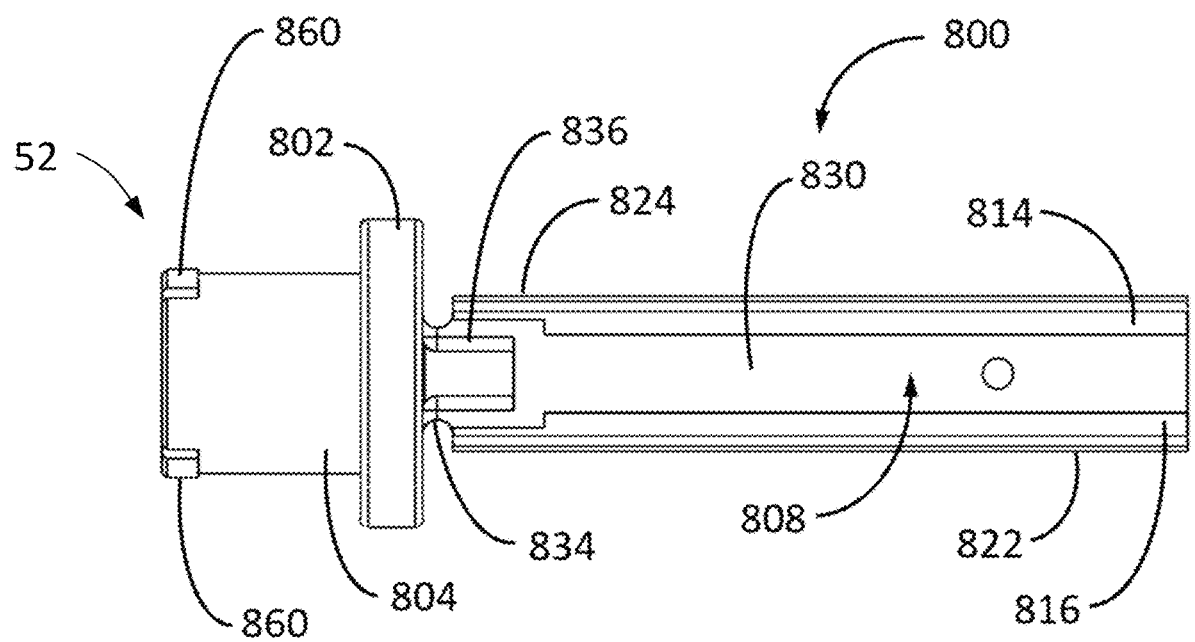
FIG. 9 shows a bottom view of the adjustable clip-on base in FIG. 8.
Figure 10:
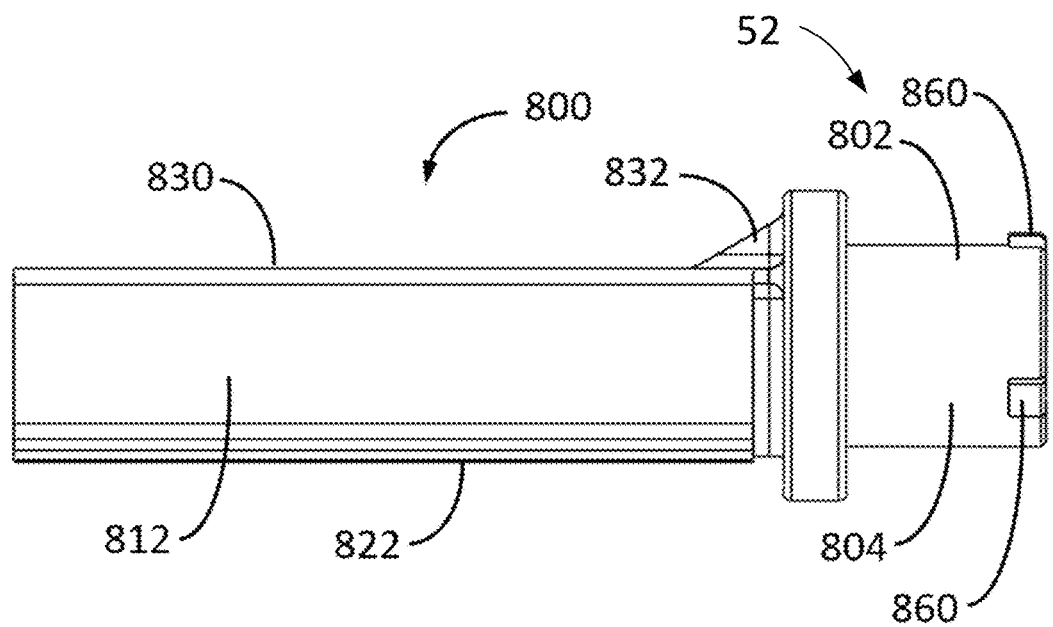
FIG. 10 shows a back view of the adjustable clip-on base in FIG. 8.
Figure 11:
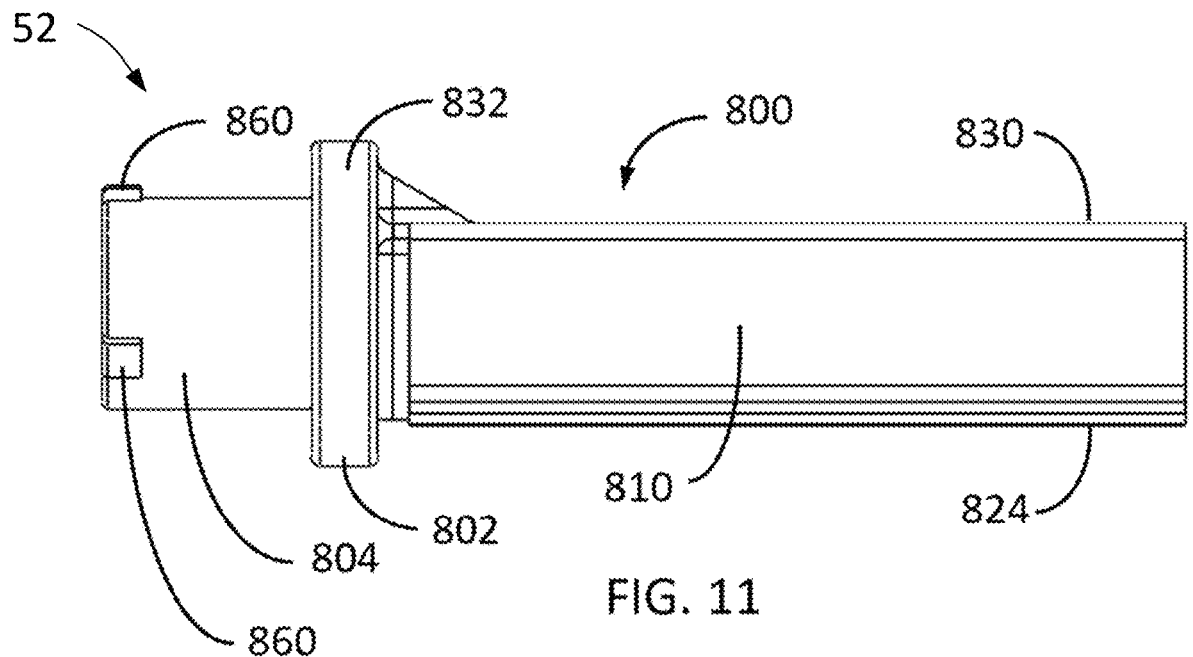
FIG. 11 shows a front view of the adjustable clip-on base in FIG. 8.
Figure 12:
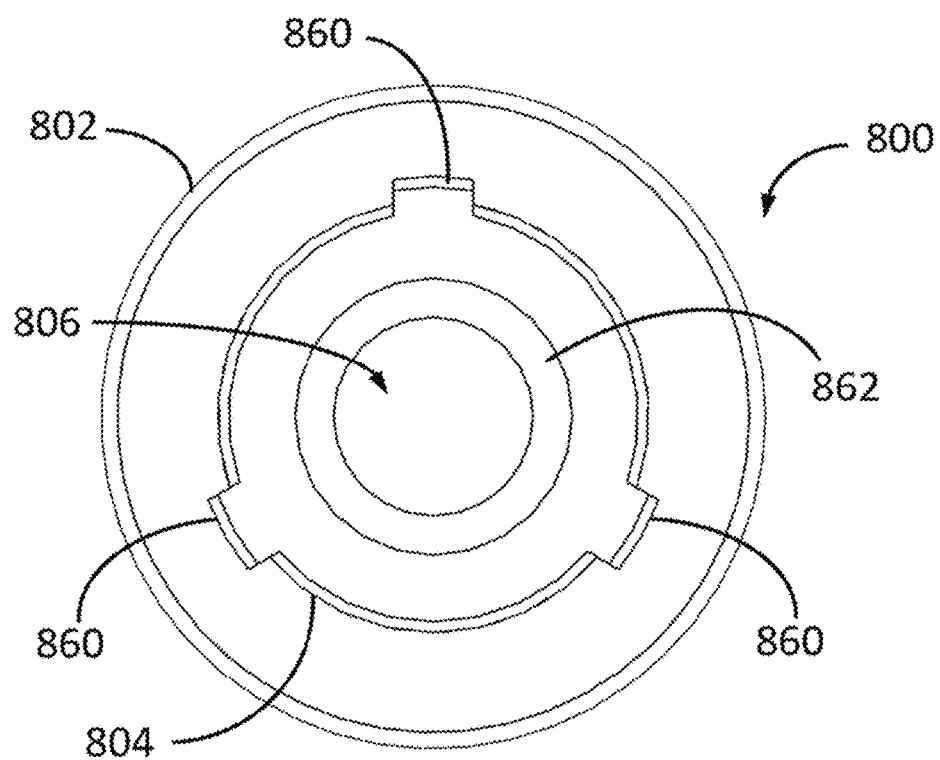
FIG. 12 shows a left side view of the adjustable clip-on base in FIG. 8.
Figure 13:
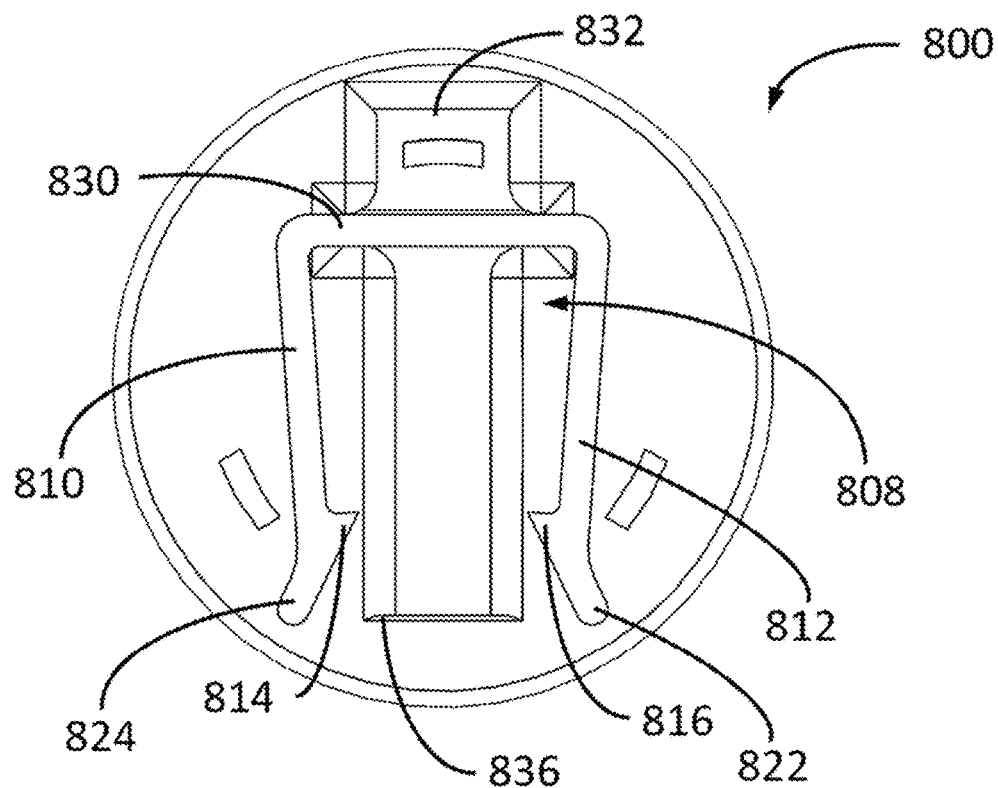
FIG. 13 shows a right side view of the adjustable clip-on base in FIG. 8.
Figure 14:
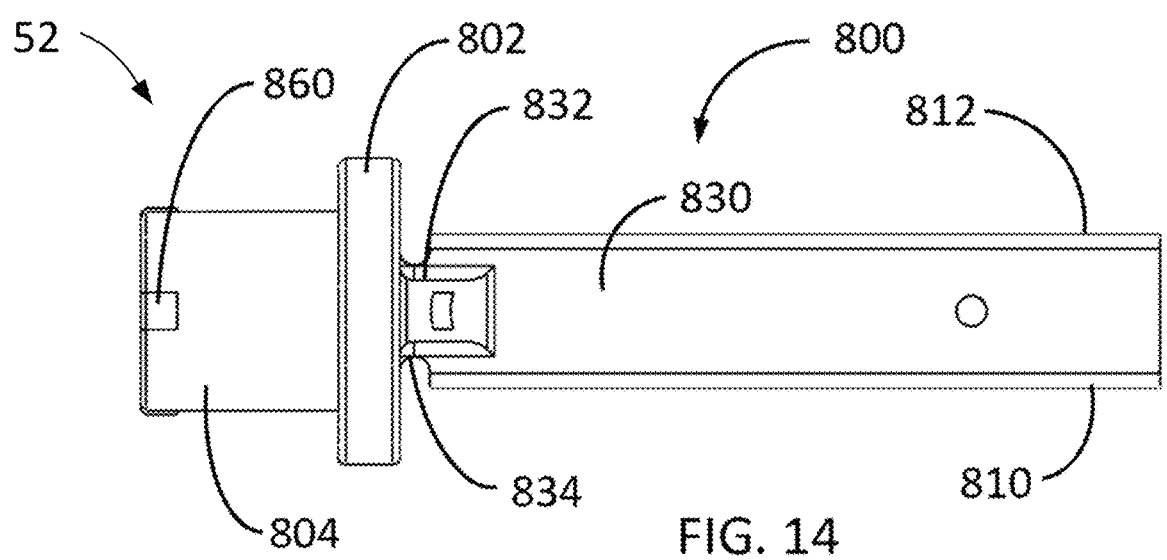
FIG. 14 shows a top view of the adjustable clip-on base in FIG. 8.

Embodiments of the invention include adaptors and methods for mounting LED lighting into various locations, such as pre-existing fluorescent lamp cabinets, walls, ceilings and other surfaces, including into back-lit signage. Some embodiments comprise adjustable clip-on bases which fit into or over pre-existing electrical sockets in fluorescent light cabinets. Some embodiments comprise adjustable clip-on bases with fit into holes in fluorescent light cabinets or other surfaces. Some embodiments comprise adjustable clip-on bases which may be screwed or bolted onto various surfaces such as walls, ceilings, or inside back-lit signage. Rather than being an "end cap" with a fixed position at the end of the LED support, the adjustable clip-on base clips onto the top, bottom or side of the LED support and so can clip on over a range of positions to change the length of the LED assembly. The clip-on adjustable base can be positioned anywhere along the LED support and is not limited to a fixed number of pre-defined positions.

Some embodiments provide a method of replacing fluorescent tube lights with LED lighting without a need to replace the pre-existing fluorescent lamp cabinet. In some embodiments, the method includes installing adjustable clip-on bases into a pre-existing fluorescent lamp fixture; cutting or selecting a support element to have a predetermined length; clipping or snapping the support element into the adjustable clip-on bases without a need for screws or other types of connectors; attaching various types of LED mounting assemblies onto the support element; then wiring up the LEDs on the LED mounting assemblies to power supplies.

Some embodiments include a LED support clip portion into which an LED support can be inserted and held, preferably without the use of adhesives or threaded hardware, although adhesives or threaded hardware may be used in addition to the clip. Attached to the LED support clip portion is a mating structure portion for attaching to the lighting enclosure. The mating structure portion includes an insertion portion that mates with the enclosure. In some embodiments, the mating structure portion is formed integrally with the support clip portion. In other embodiment, the mating structure portion comprises multiple components, such as a first component that is integral with the support clip portion and a second component that is attached to the first component. For example, the second component could include an insertion portion and can be held to the first component by a mechanical arrangement including a biasing spring. In other embodiments, the insertion component can be merely holes for screwing the mating structure to a wall.

First Embodiment of an Adjustable Clip-On Base

FIGS. 1A-7 show two isometric views from different perspectives, a bottom view, a back view, a front view, a left side view, a right side view, and a top view, respectively, of an adjustable clip-on base 100 in accordance with a first embodiment. The following discussion refers to the callouts in FIGS. 1A-7.

The adjustable clip-on base 100 comprises a support clip portion 130 for removably attaching the adjustable clip-on base onto an LED support, the support clip portion being attachable to the LED support over a range of position and a mating structure portion 52 structure extending from the support clip portion 130, the mating structure portion 52 configured for mating with a lighting enclosure to mount the LED support into the lighting enclosure.

The support clip portion is re-positionable over the range of positions to alter the distance that the mating structure portion extends out from the end of the LED support. The length of the LED assembly can therefore be adjusted after the LED support is cut, thereby reducing the need to cut the LED support to an exact length. That is, the LED support can be cut to a length shorter than the length that would be required with fixed end cap. The position of the adjustable clip-on base on one or both ends of the LED assembly can be adjusted to provide the desired length of the LED assembly. To shorten the LED assembly, the overlap of the adjustable clip-on base with the LED support can be increased up to the point at which the mating structure portion of the adjustable clip-on base interferes with the LED support. To lengthen the LED assembly, the overlap of the adjustable clip-on base and the LED support can be decreased by moving the adjustable clip-on base further out from the end of the LED support. A sufficient length of the support clip portion of the adjustable clip-base should remain engaged with the LED support to provide mechanical support for the assembly. For example, it may desirable that at last ½ of the support clip portion remain engaged with the LED support.

In some embodiments, the mating structure portion 52 includes a generally planar base plate 102 which in some embodiments may comprise a circular disk, onto which insertion portion 104 is attached extending away on one side from the plane of the base plate 102 in a direction generally perpendicular to the plane of the base plate 102. Fitting 104 is shaped with an exterior profile and a center hole 106 so that insertion portion 104 can be inserted into a complementary-shaped socket in a standard commercial fluorescent light fixture, which may be pre-existing. Insertion portion 104 may comprise the shape (but not the functionality) of a standardized fitting used for light fixtures used with longitudinal-shaped lamps, such as fluorescent tube fixtures. Fitting 104 may comprise a non-conducting material, such as plastic or rubber, to prevent the transmission electricity from the fluorescent fitting in the lighting cabinet. From an opposite side of base plate 102, support clip portion 130 extends in a direction generally perpendicular to the plane of the base plate 102. A first jaw 110 and a second jaw 112 may be attached to opposing edges of the support clip portion 130 as shown, wherein a gap 108 between the first jaw 110 and the second jaw 112 forms a clip for attachment to a support element.

To facilitate improved clipping of the support element in the gap 108, one or more inward-facing projections, such as hooks 114 and 116, may be located as shown near the distal ends of jaws 110 and 112 away from the support clip portion 130, respectively. The combined action of hooks 114 and 116 may prevent the support element from sliding out from between jaws 110 and 112. A gripping force on the support element may be increased by angling jaws 110 and 112 slightly towards each other (producing a negative "toe-in" angle) so that a spacing between hooks 114 and 116 is smaller than a spacing between the attachment locations of jaws 110 and 112 to the support clip portion 130. To facilitate insertion of the support element into the gap 108, in embodiments two angled tabs 124 and 122 may be located at the distal ends of jaws 110 and 112, respectively. As a support element is pushed into gap 108, angled tabs 122 and 124 are operable to increase the gap 108 between jaws 110 and 112, thereby facilitating easier insertion of the support element into the gap 108. In embodiments, the first and second jaws 110 and 112 may be operable to grip a support element having a rectangular, square, triangular, circular, I-shaped, oval, or hexagonal cross-sectional shape.

To strengthen the adjustable clip-on base 100, some embodiments may employ reinforcing braces 132 and 134 as shown, to reduce bending of the support clip portion 130 with respect to the base plate 102. Braces 132 and 134 extend from the top, external surface of support clip portion 130 to base plate 102. Internal brace 136 further strengthens the attachment of support clip portion 130 to the base plate 102 as well as providing a stop for the support element as it is being inserted into the adjustable clip-on base 100. Internal brace 136 extends from the interior, top surface of support clipping portion 130 to base plate 102. An optional hole 138 allows the use of self-tapping screw (not shown) to provide additional friction against the LED support element to reduce the possibility of adjustable clip-on base 100 moving relative to the LED support element after the adjustable clip-on base 100 is clipped onto the LED support element.

Whiles FIG. 1A-7 show an embodiment for mounting in a fluorescent fixture that uses an oblong connector, in other embodiments the insertion portion can be configured to be inserted into a bi-pin connector or any other type of connector.

Second Embodiment of an Adjustable Clip-on Base for Use with a Spring Fitting for Mating within a Hole in a Lighting Enclosure FIGS. 8A-14 show two isometric views, a bottom view, a back view, a front view, a left side view, a right side view, and a top view, respectively, of an adjustable clip-on base 800 in accordance with the second embodiment. This embodiment is used with a spring and a terminal element, the terminal element having an insertion portion for attaching to a lighting cabinet. Various insertion portions can be used for various mating with, for example, different types of holes. The following discussion refers to the callouts in FIGS. 8A-14. The design and operation of elements 802, and 806-836 may be similar, or the same as, the design and operation of elements 102 and 106-136 in adjustable clip-on base 100. The structure and function of fitting 804, tabs 860, center tube 862, and center hole 806, are described in the discussion of an adjustable clip-on base assembly 1500 in FIGS. 15-22 which employs adjustable clip-on base 800.

Assembly Employing the Adjustable Clip-on Base of the Second Embodiment

FIGS. 15-22 show an exploded isometric view, two isometric views, a bottom view, a back view, a front view, a left side view, a right side view, and a top view, respectively, of an adjustable clip-on base assembly 1500 employing the adjustable clip-on base 800. The following discussion refers to the callouts in FIGS. 8-22.

The design of adjustable clip-on base 800 is disclosed in FIGS. 8-14, and the following discussion in FIGS. 15-22 discloses the operation of adjustable clip-on base assembly 1500, which include adjustable clip-on base 800 and connection portion 1510 that includes a spring 1502 and a terminal element 1512. Terminal element 1512 includes a spring-loaded mounting plate 1504 which comprises an insertion element 1702 having an outer surface with serrations 1704 (see FIG. 20). Mounting plate 1504 may function to locate and support adjustable clip-on base 800 by insertion of insertion element 1702 into a hole (either pre-existing or newly-made) in a pre-existing fluorescent light fixture or other enclosure. The serrations 1704 on the outer conical surface of the insertion element 1702 then serve to lock mounting plate 1504 in place through enhanced friction with the edge of the hole. While insertion element 1702 shown is designed to mate with a round hole, other designs of insertion element 1702 may be configured to mate within an existing "D"-shaped mounting bracket. In other embodiments, insertion element 1702 is cup-shaped and designed to fit over a fluorescent fixture or against a wall of the lighting enclosure.

Figure 15:
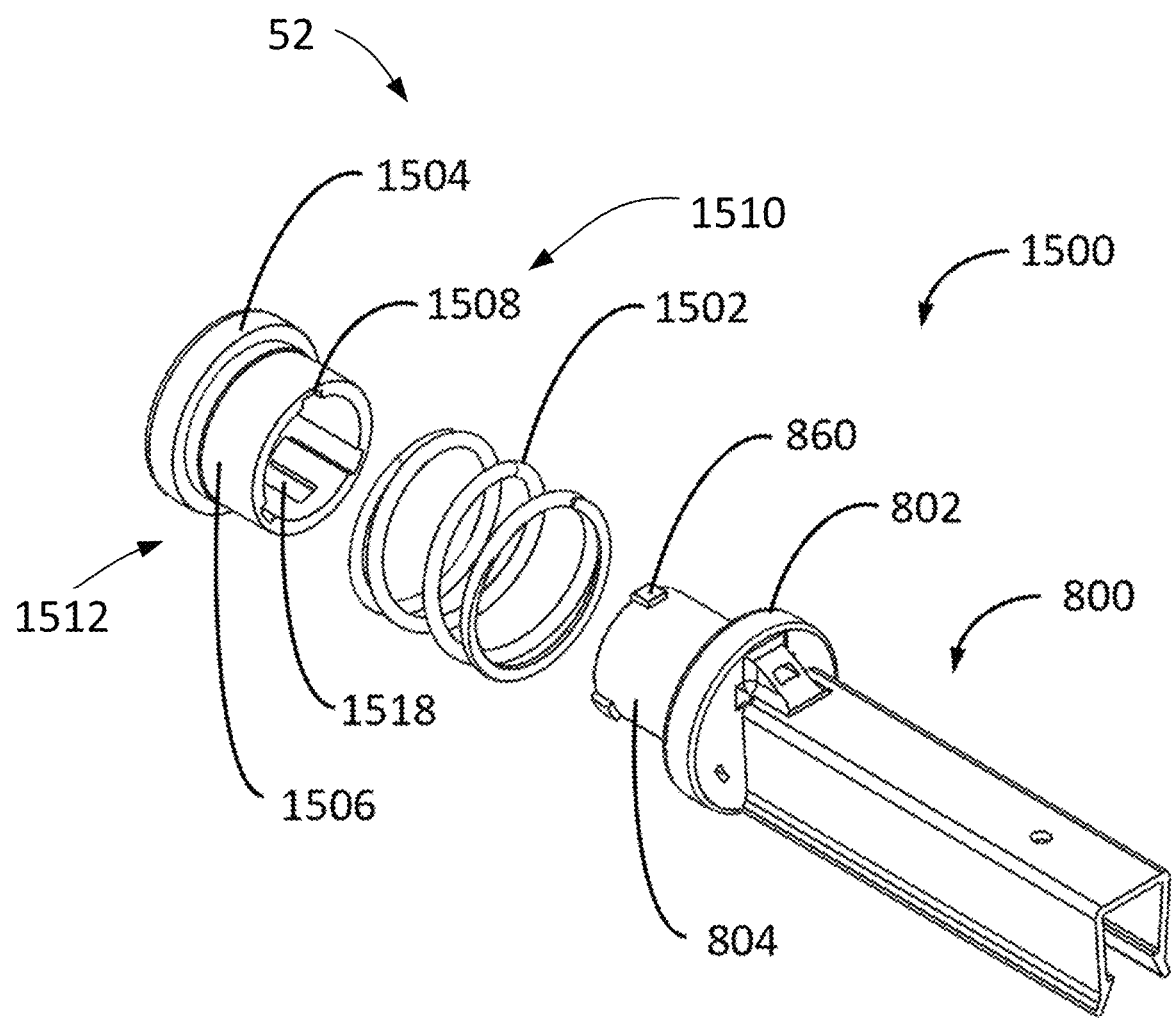
FIG. 15 shows an exploded isometric view of an adjustable clip-on base assembly in accordance with the second embodiment.
Figure 16A:
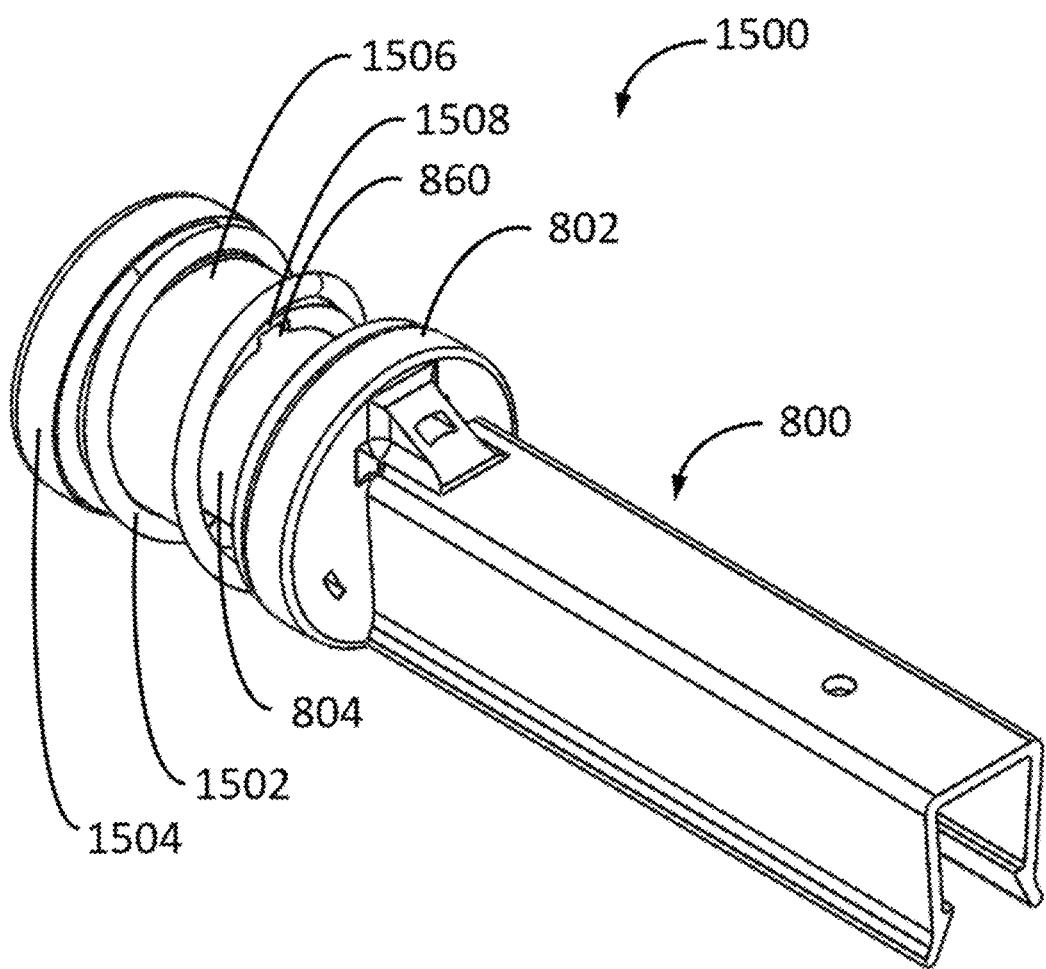
FIGS. 16A and 16B show isometric views of the adjustable clip-on base assembly in FIG. 15.
Figure 16B:
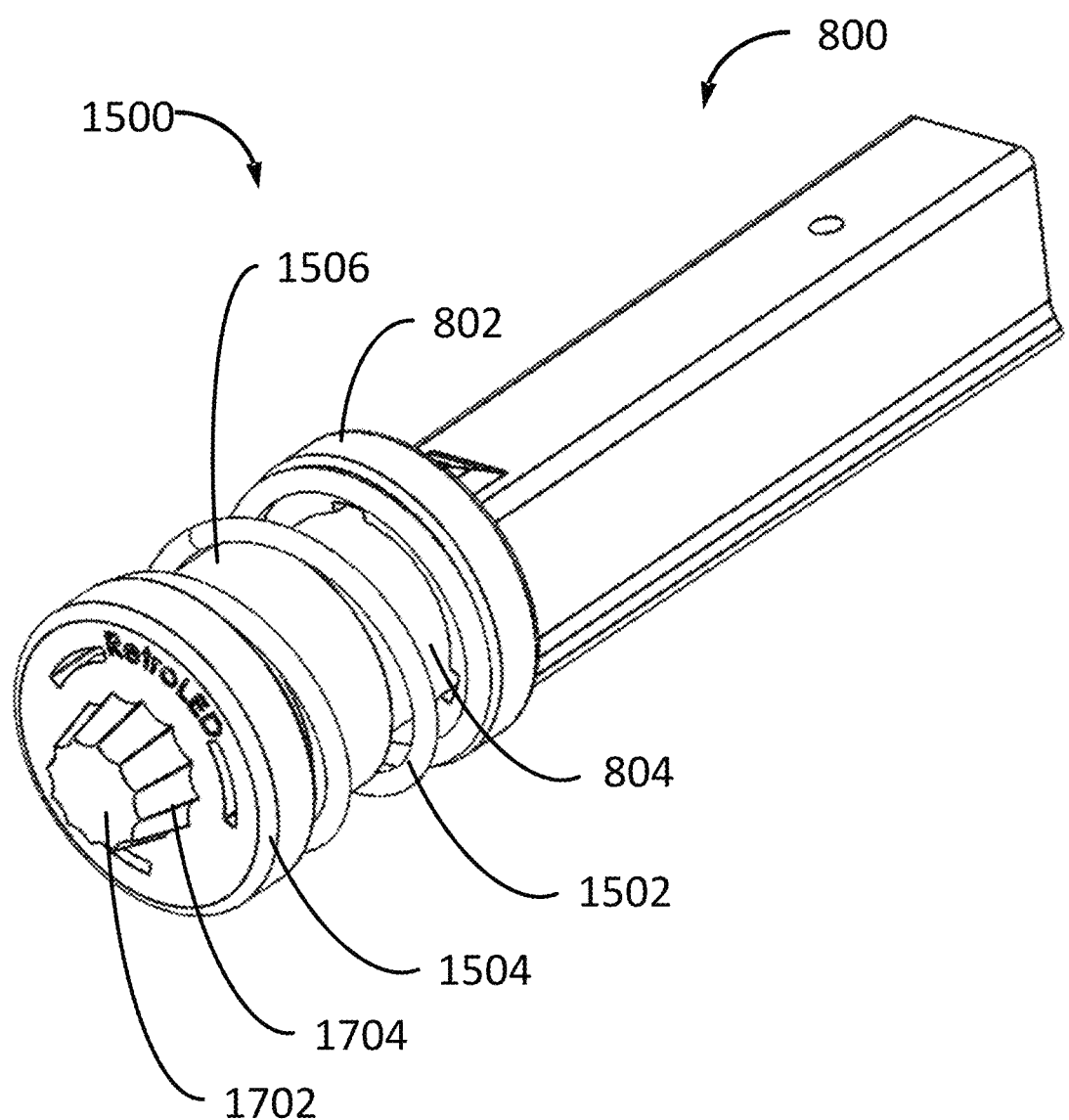
Figure 17:
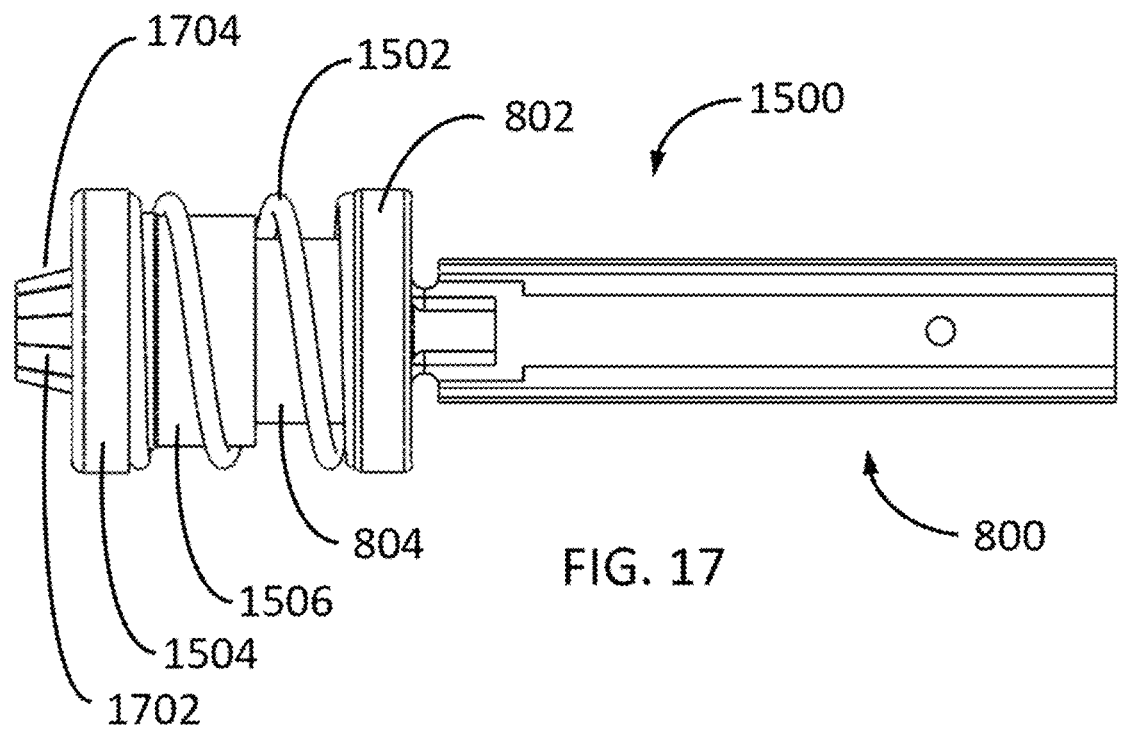
FIG. 17 shows a bottom view of the adjustable clip-on base assembly in FIG. 15.
Figure 18:
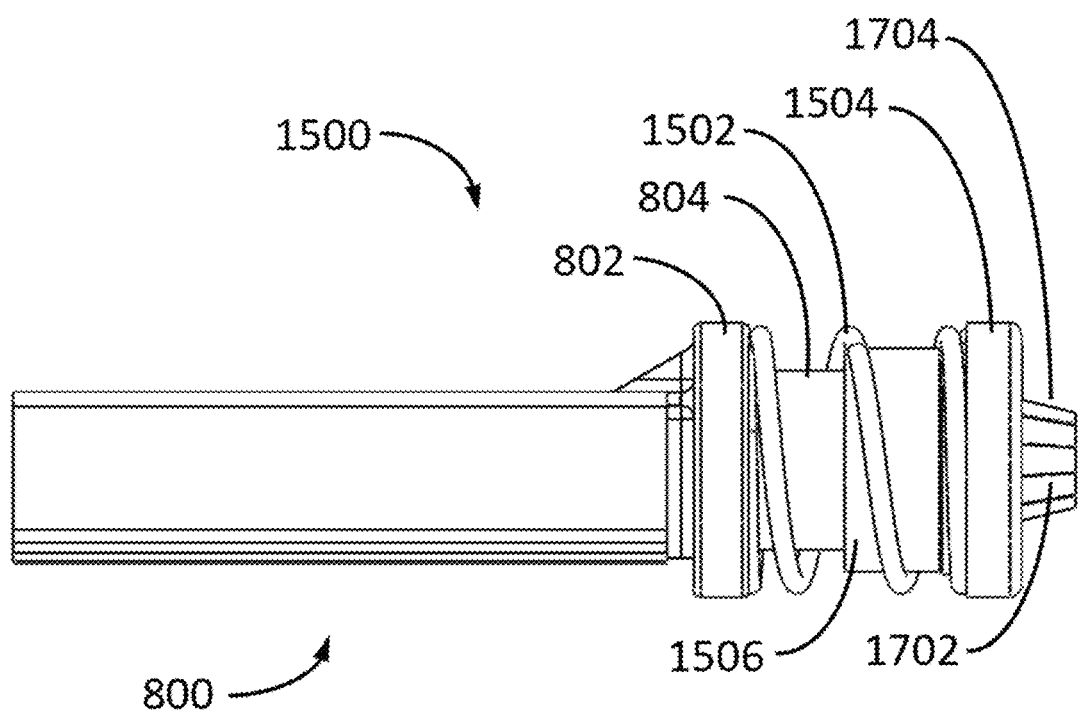
FIG. 18 shows a back view of the adjustable clip-on base assembly in FIG. 15.
Figure 19:
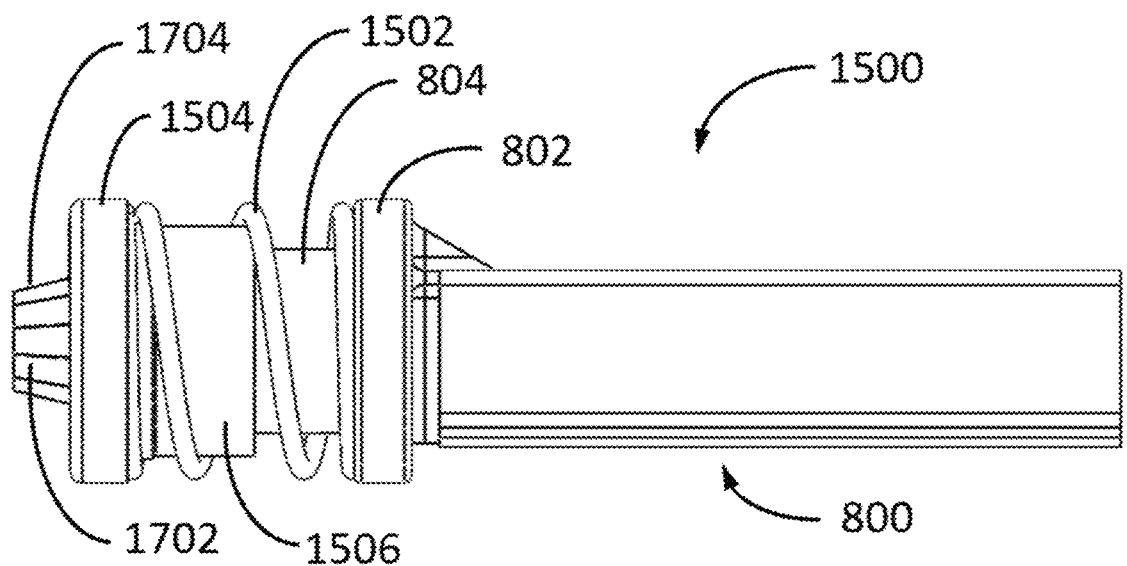
FIG. 19 shows a front view of the adjustable clip-on base assembly in FIG. 15.
Figure 20:
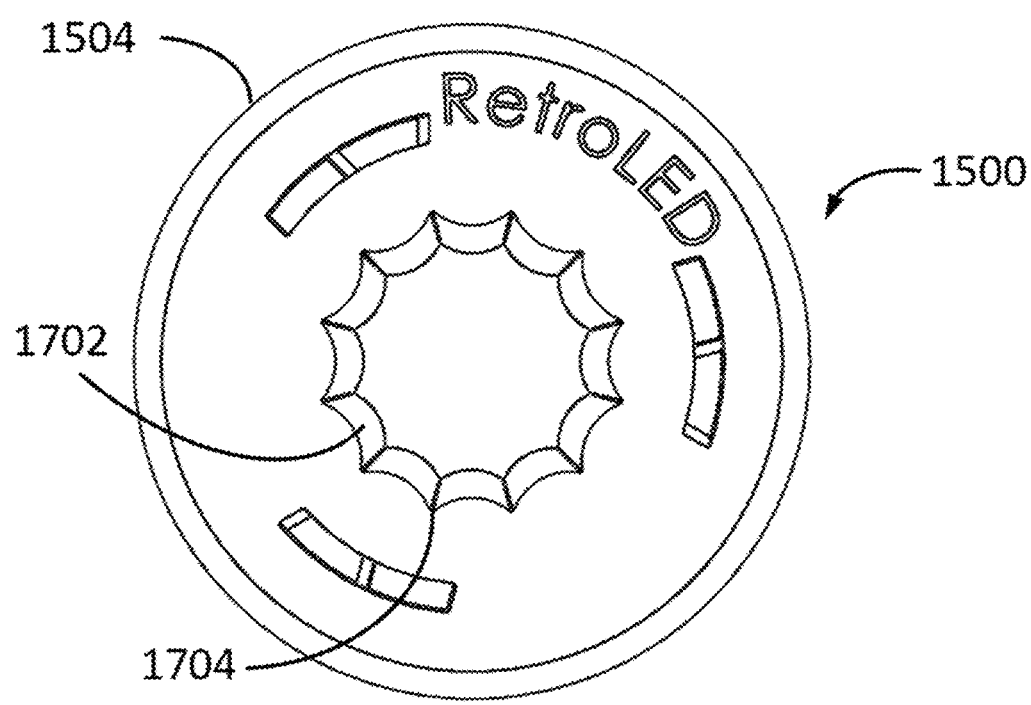
FIG. 20 shows a left side view of the adjustable clip-on base assembly in FIG. 15.
Figure 21:
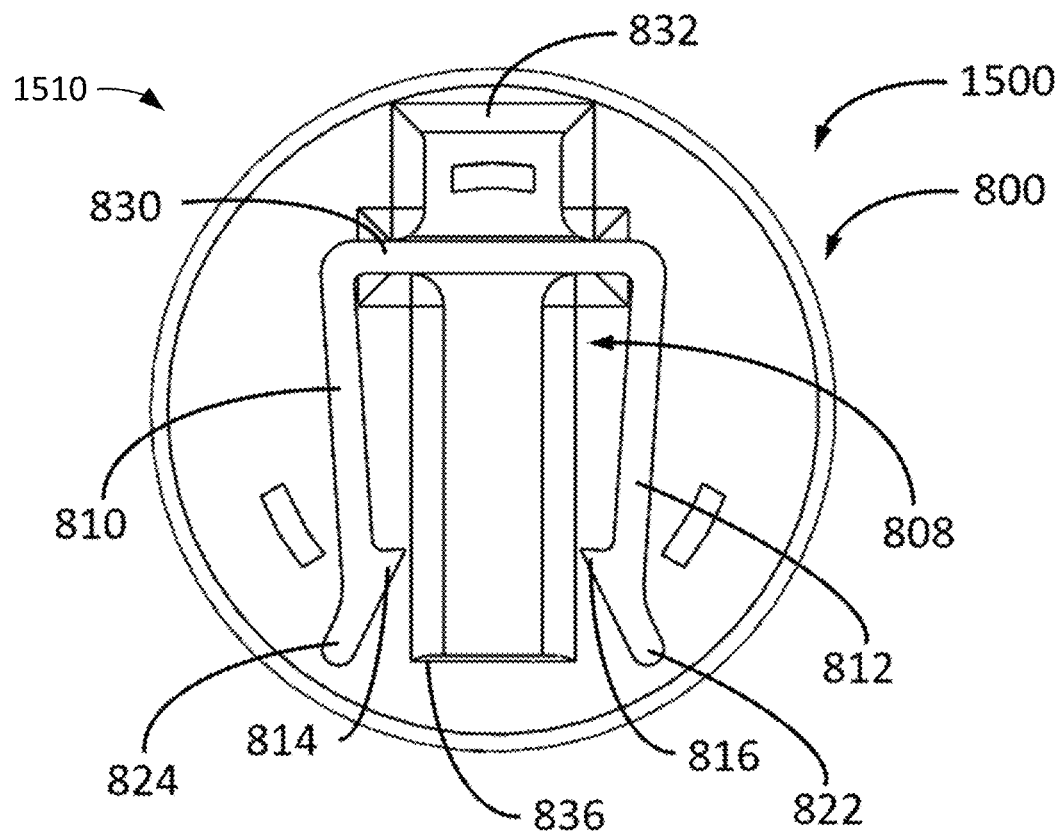
FIG. 21 shows a right side view of the adjustable clip-on base assembly in FIG. 15.
Figure 22:
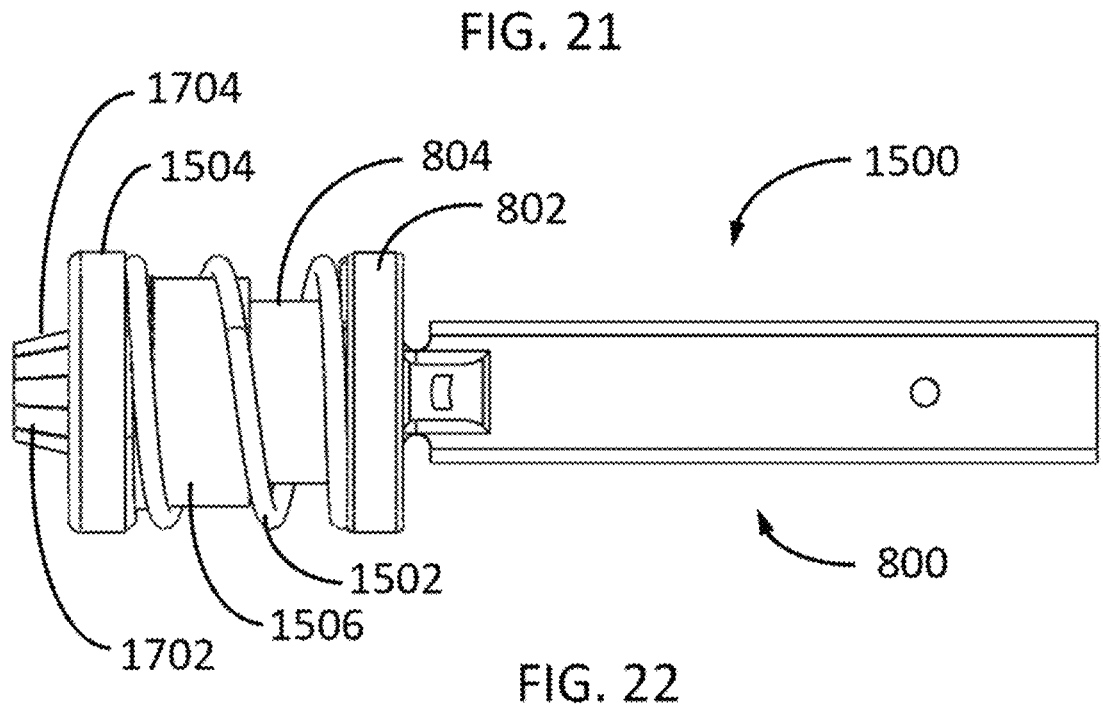
FIG. 22 shows a top view of the adjustable clip-on base assembly in FIG. 15.
Figure 23:
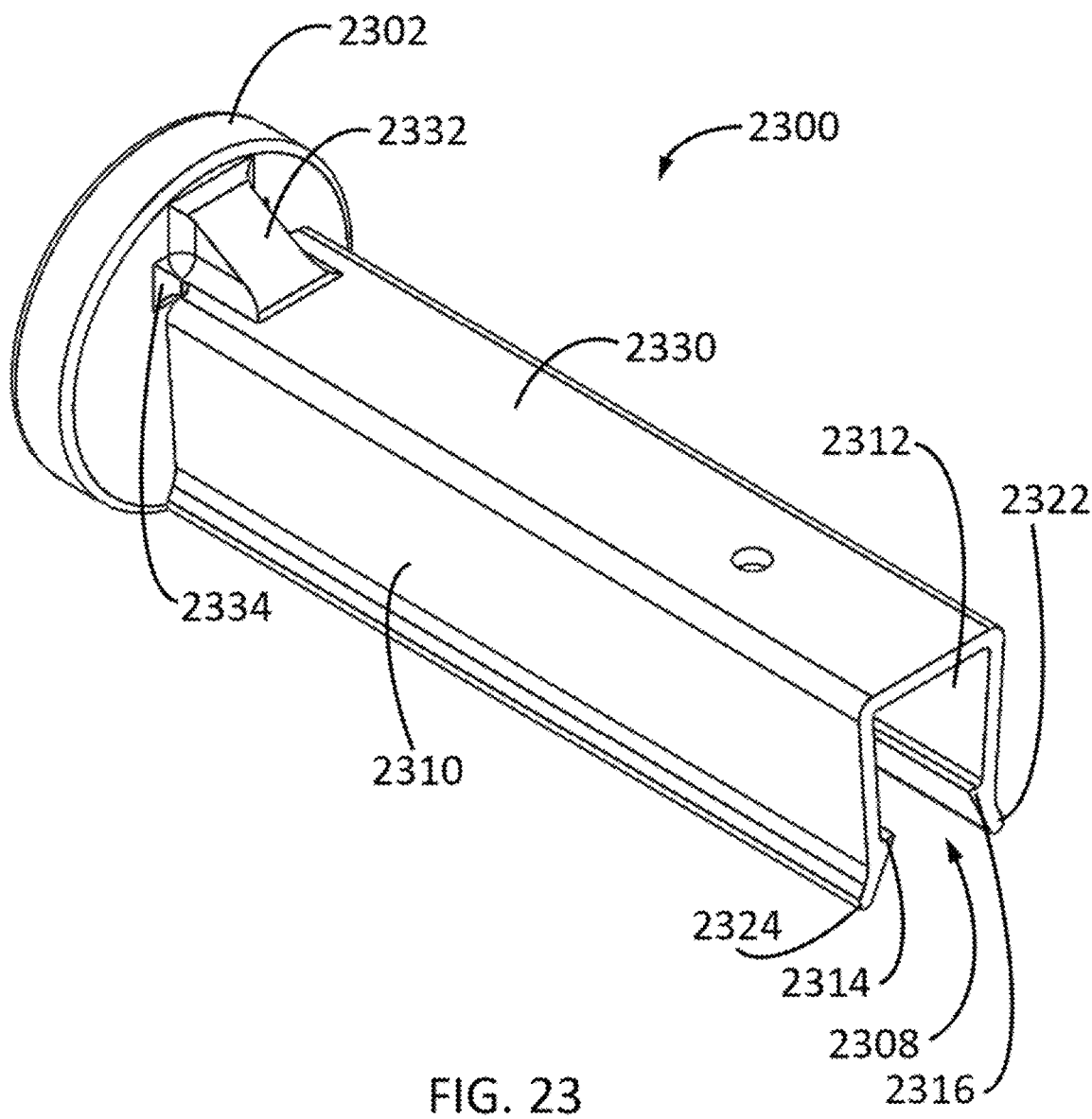
FIG. 23 shows an isometric view of an adjustable clip-on base in accordance with a third embodiment.
Figure 24:
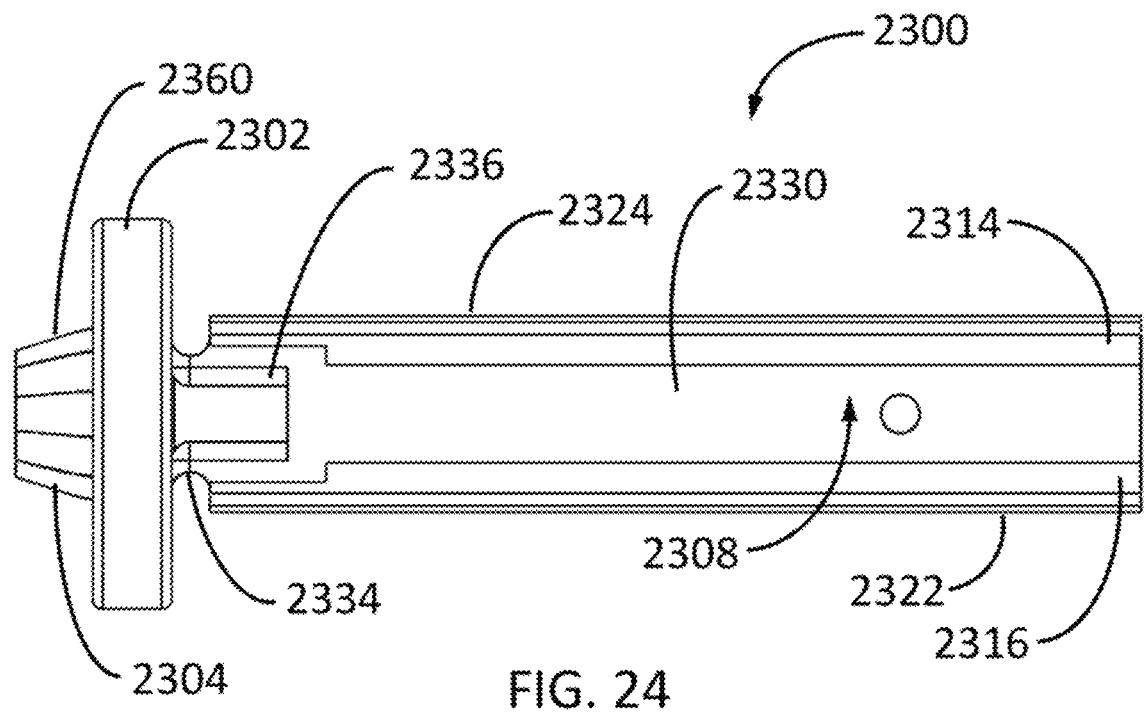
FIG. 24 shows a bottom view of the adjustable clip-on base in FIG. 23.
Figure 25:
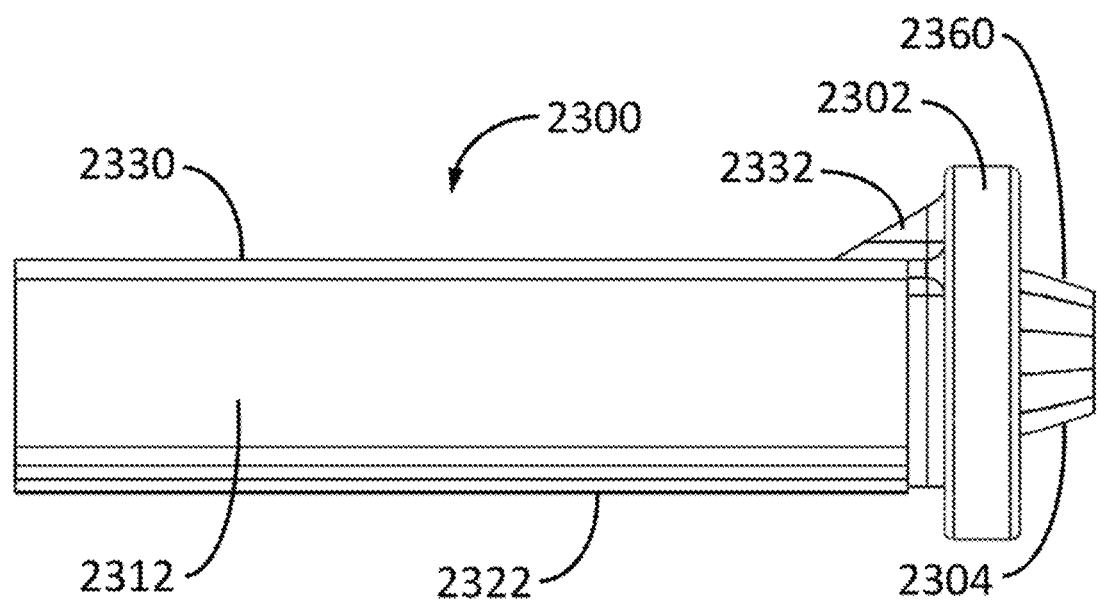
FIG. 25 shows a back view of the adjustable clip-on base in FIG. 23.
Figure 26:
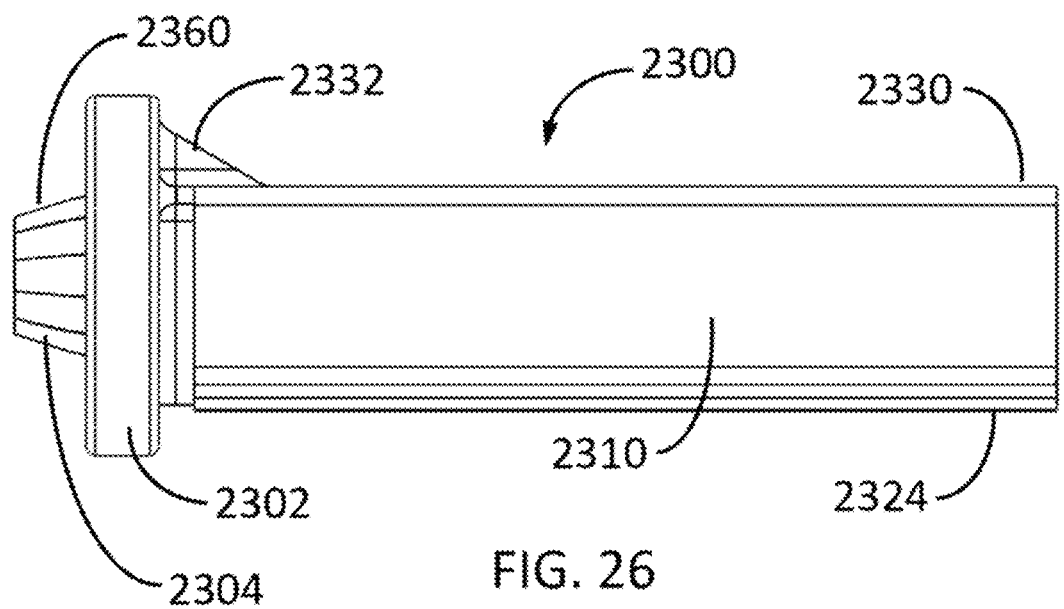
FIG. 26 shows a front view of the adjustable clip-on base in FIG. 23.
Figure 27:
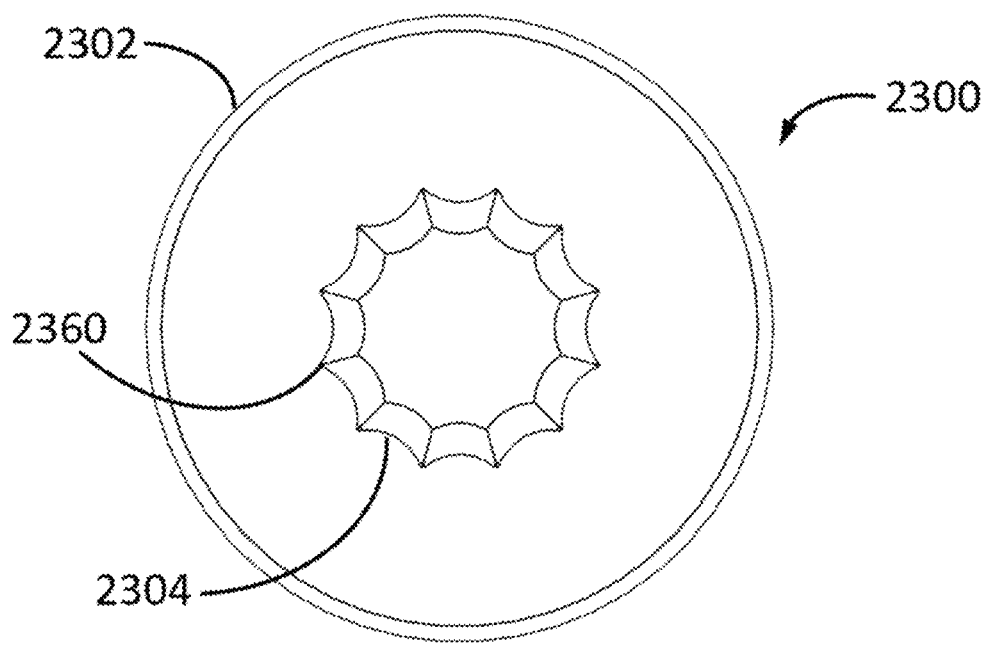
FIG. 27 shows a left side view of the adjustable clip-on base in FIG. 23.
Figure 28:
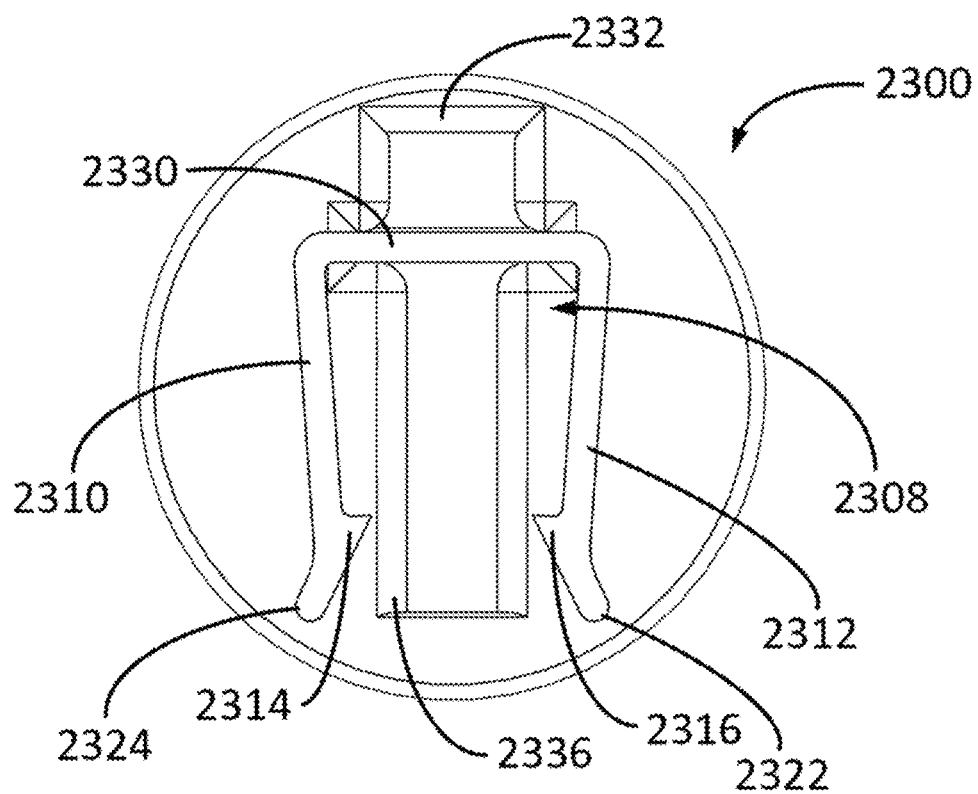
FIG. 28 shows a right side view of the adjustable clip-on base in FIG. 23.
Figure 29:
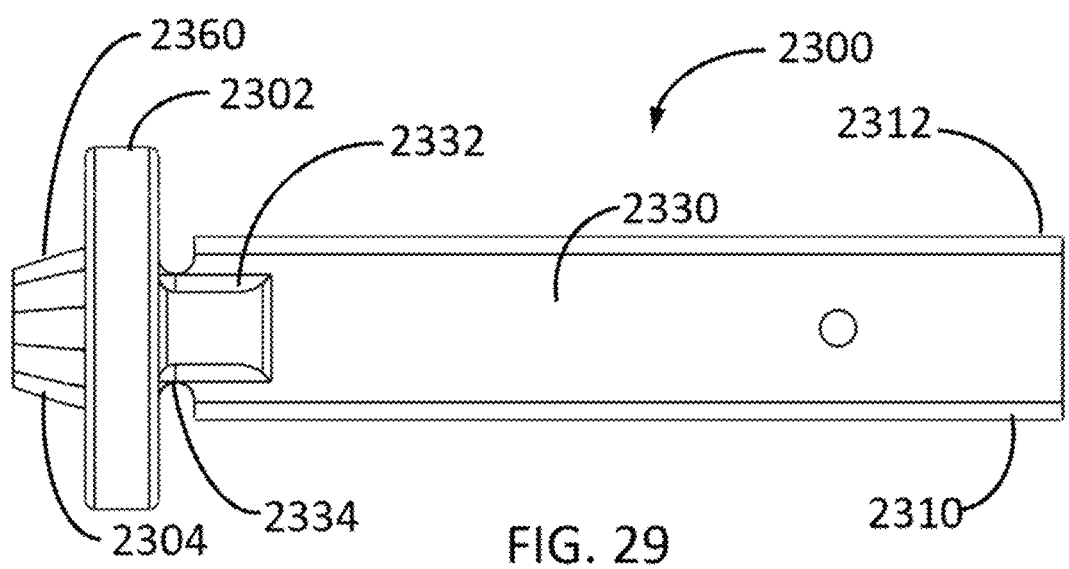
FIG. 29 shows a top view of the adjustable clip-on base in FIG. 23.
Figure 30:
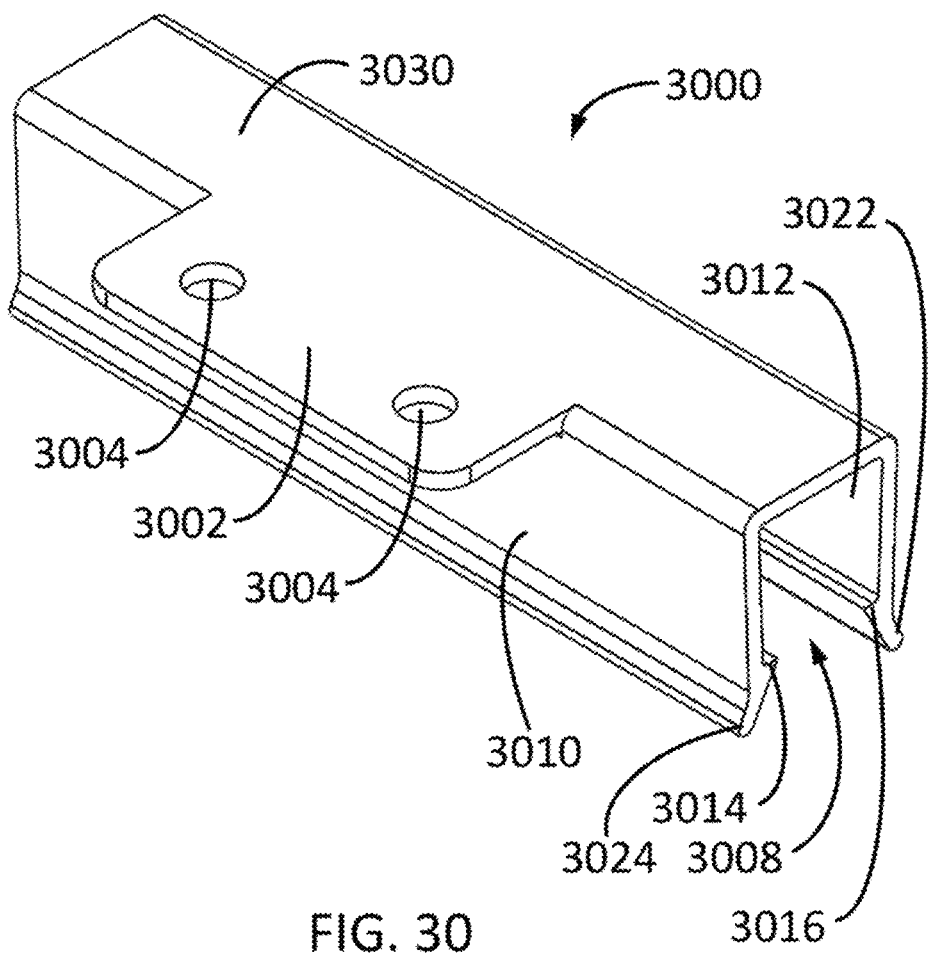
FIG. 30 shows an isometric view of an adjustable clip-on base in accordance with a fourth embodiment.
Figure 31:
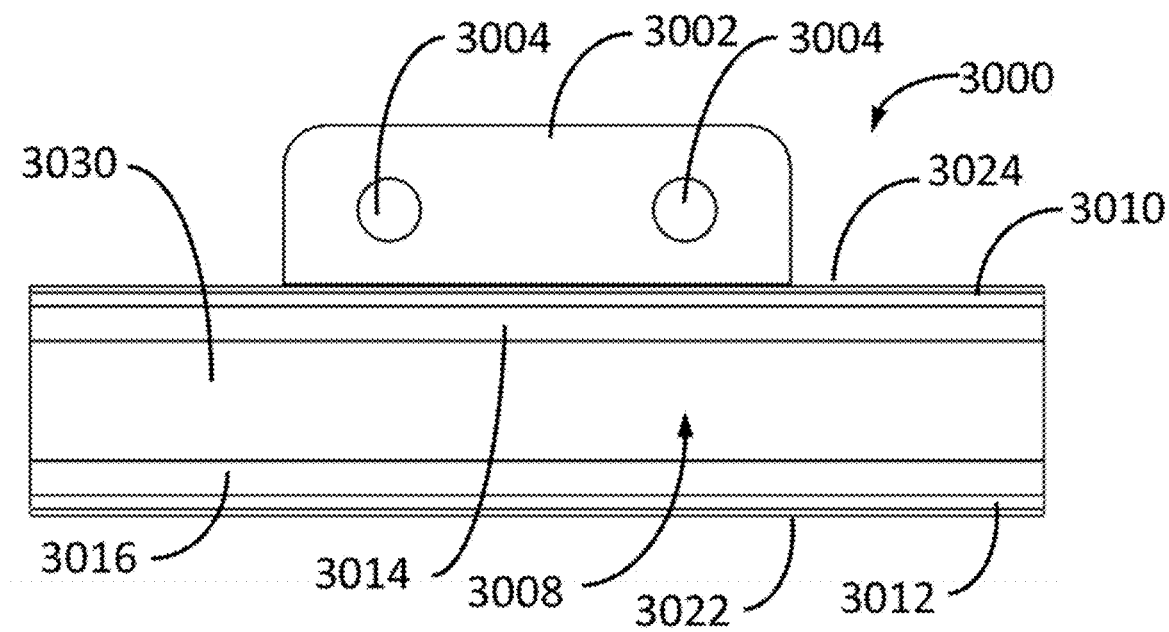
FIG. 31 shows a bottom view of the adjustable clip-on base in FIG. 30.
Figure 32:
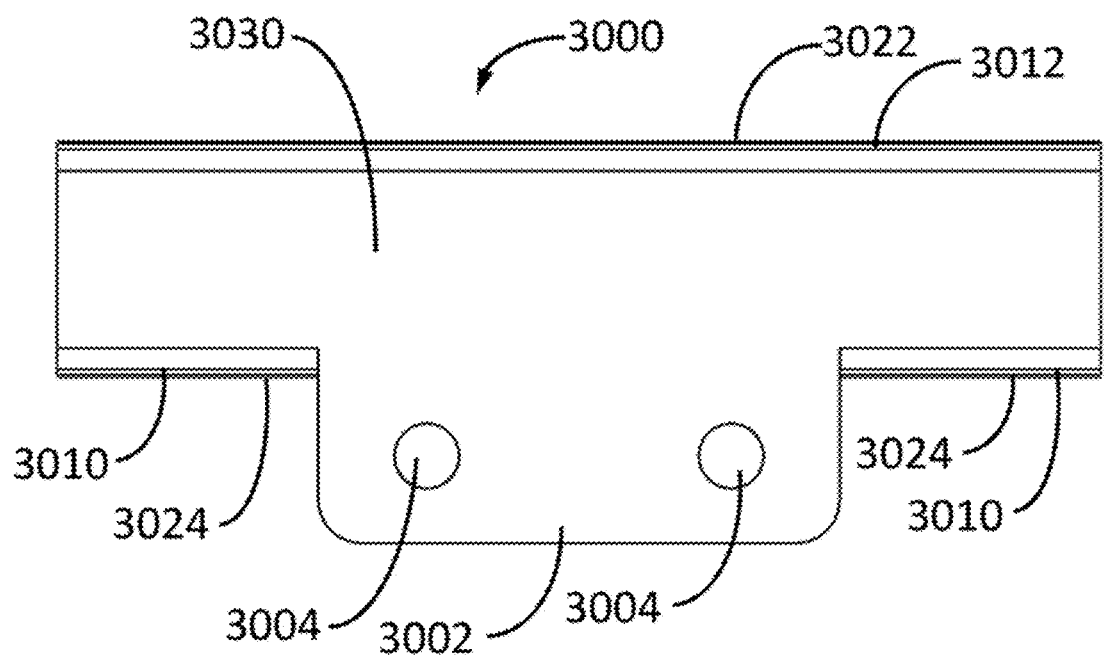
FIG. 32 shows a top view of the adjustable clip-on base in FIG. 30.
Figure 33:
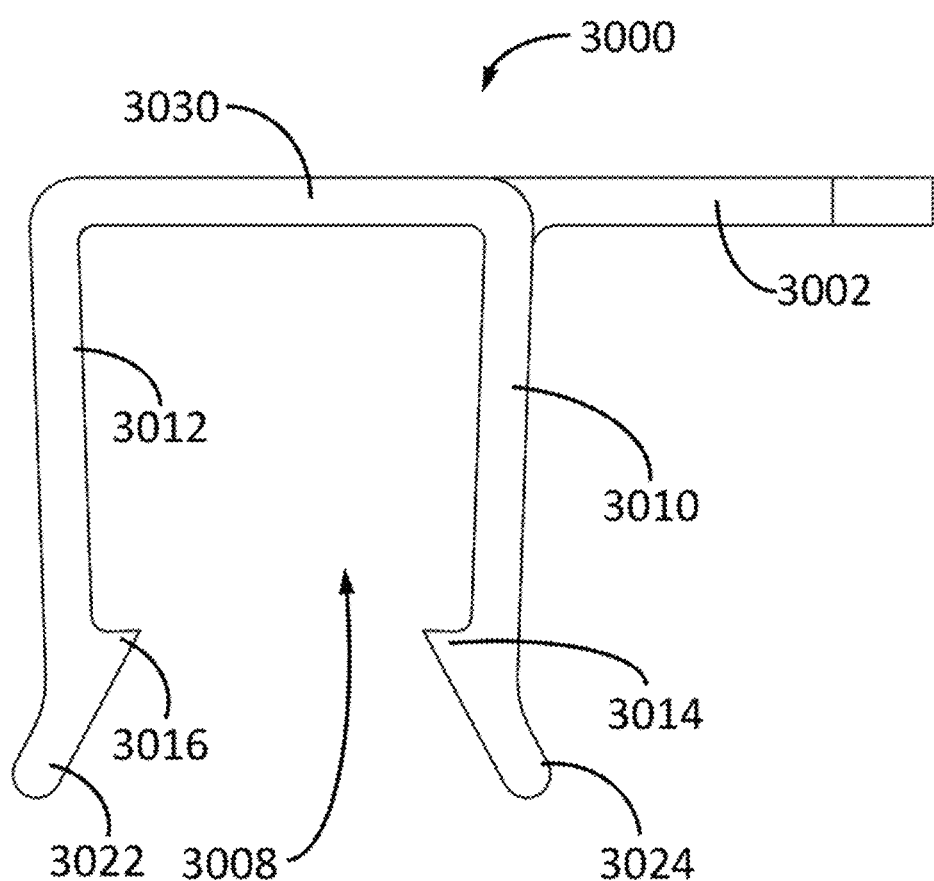
FIG. 33 shows a left side view of the adjustable clip-on base in FIG. 30.

FIG. 15 shows an exploded view of an adjustable clip-on base assembly 1500 and FIGS. 16A and 16B show adjustable clip-on base assembly 1500. Spring 1502 may function to hold adjustable clip-on base 800 apart from mounting plate 1504. During operation, spring 1502 maintains an LED assembly to which adjustable clip-on base assembly 1500 is attached between two walls of a lighting cabinet. During construction of adjustable clip-on base assembly 1500, spring 1502 may be placed between adjustable clip-on base 800 and mounting plate 1504 as shown in FIG. 15. Then adjustable clip-on base 800 may be moved axially towards mounting plate 1504, thereby capturing spring 1502 between adjustable clip-on base 800 and an annular surface of mounting plate 1504 having a diameter corresponding to the diameter of spring 1502 as shown in FIG. 16. During this assembly process, the three tabs 860 on adjustable clip-on base 800 may slide into the corresponding three slots 1508 in mounting plate 1504. The three slots 1508 terminate within mounting plate 1504 in an azimuthal slot enabling mounting plate 1504 to be rotated with respect to adjustable clip-on base 800 after spring 1502 has been sufficiently compressed. After this relative rotation of mounting plate 1504 and adjustable clip-on base 800 has been completed, tabs 860 may slide within a second set of slots 1518 which extend within mounting plate towards adjustable clip-on base 800. The effect of this combined operation of tabs 860 first sliding into slots 1508 and then within slots 1518 is to lock the mounting plate 1504 to adjustable clip-on base 800 with spring 1502 forcing mounting plate 1504 away from adjustable clip-on base until the three tabs 860 reach the ends of the second set of slots 1518 at which point, the separation between the mounting plate 1504 and adjustable clip-on base 800 can no longer increase. Once a support element has been inserted into adjustable clip-on base 800 and also inserted into a second opposing adjustable clip-on base as described in FIG. 34, spring 1502 may be somewhat compressed (and mounting plate 1504 moved closer to adjustable clip-on base 800) thereby applying an increased axial force to mounting plate 1504 to ensure that fitting 1702 remains securely locked into the hole of the fluorescent light fixture or other surface.

Third Embodiment of an Adjustable Clip-On Base

FIGS. 23-29 show an isometric view, a bottom view, a back view, a front view, a left side view, a right side view, and a top view, respectively, of an adjustable clip-on base 2300 in accordance with the third embodiment. The following discussion refers to the callouts in FIGS. 23-29.

The design and operation of elements 2302, and 2306-2336 may be similar, or the same as, the design and operation of elements 102 and 106-136 in adjustable clip-on base 100 and elements 802 and 806-836 in adjustable clip-on base 800. The operation of adjustable clip-on base 2300 is similar to the operation of adjustable clip-on base assembly 1500 except that some of the functions of mounting plate 1504 in adjustable clip-on base assembly 1500 are combined with the functions of mounting plate 802 in adjustable clip-on base 800. In particular, adjustable clip-on base 2300 comprises a locking fitting 2304 having an outer surface with serrations 2360 (see FIG. 27) which function similarly to the serrations 1704 on the outer surface of locking fitting 1702. Mounting plate 2302 may function to locate and support adjustable clip-on base 2300 by insertion of locking fitting 2304 into a hole (either pre-existing or newly-made) in a pre-existing fluorescent light fixture or other enclosure. The serrations 2360 on the outer conical surface of the locking fitting 2304 then serve to lock the mounting plate 2302 in place through enhanced friction with the edge of the hole.

An adjustable clip-on base 2300 may be used on one end of LED support, while adjustable clip-on base 1500 is used on the opposite side of the LED support, since the spring is only required on side of the LED support. The end of the LED support with spring loaded adjustable clip-on base 1500 is inserted into a hole in one side of a lighting cabinet. The spring is compressed, and the insertion portion of the opposing side of the LED support is inserted into a hole in the opposite side of the lighting cabinet as the spring is released, the spring then maintaining the LED assembly in position with both ends engaged in opposing lighting cabinet walls.

Fourth Embodiment of an Adjustable Clip-On Base

FIGS. 30-33 show an isometric view, a bottom view, a top view, and a left side view, respectively, of an adjustable clip-on base 3000 in accordance with the fourth embodiment. The following discussion refers to the callouts in FIGS. 30-33.

The design and operation of elements 802, and 806-836 may be similar, or the same as, the design and operation of elements 102 and 106-136 in adjustable clip-on base 100.

A support clip portion 3030 of adjustable clip-on base 3000 is generally planar, determining the mounting location and orientation of the adjustable clip-on base 3000 onto an attachment surface. A first jaw 3010 and a second jaw 3012 may be attached to opposing edges of the support clip portion 3030 as shown, wherein a gap 3008 between the first and second jaws 3010 and 3012 forms a clip for attachment to a support element. To facilitate improved gripping of the support element in the gap 3008, two inward-facing hooks 3014 and 3016 may be located as shown near the ends of jaws 3010 and 3012 away from the support clip portion 3030, respectively. The combined action of hooks 3014 and 3016 may be to prevent the support element from sliding out from between jaws 3010 and 3012. A gripping force on the support element may be increased by angling jaws 3010 and 3012 slightly towards each other so that spacing between hooks 3014 and 3016 is smaller than a spacing between the attachment locations of jaws 3010 and 3012 to the support clip portion 3030. To facilitate insertion of the support element into the gap 3008, in embodiments two leads 3024 and 3022 may be located at the ends of jaws 3010 and 3012, respectively. As a support element is pushed into gap 3008, leads 3022 and 3024 are operable to increase the gap 3008 between jaws 3010 and 3012, thereby facilitating easier insertion of the support element into the gap 3008. In embodiments, the first and second jaws 3010 and 3012 may be operable to grip a support element having a rectangular, square, triangular, circular, I-shaped, oval, or hexagonal cross-sectional shape.

A mounting tab 3002 is attached to an edge of the support clip portion 3030 and protrudes outwards away from the support clip portion in a direction approximately parallel to the support clip portion, so that the mounting tab 3002 and the support clip portion 3030 form a generally planar surface suitable for attachment of adjustable clip-on base 3000 against a generally flat surface. One or more holes 3004 may enable attachment of adjustable clip-on base 3000 using screws or bolts.

Support Element Cross-Sectional Shapes

In adjustable clip-on bases 100, 800, 2300, and 3000, may be operable to grip a support element having a rectangular, square, triangular, circular, I-shaped, oval, or hexagonal cross-sectional shape. Some embodiments may be operable to grip a multiplicity of shapes.

Replacing Fluorescent Lights with LEDs Using Adjustable Clip-On Bases

Figure 34:
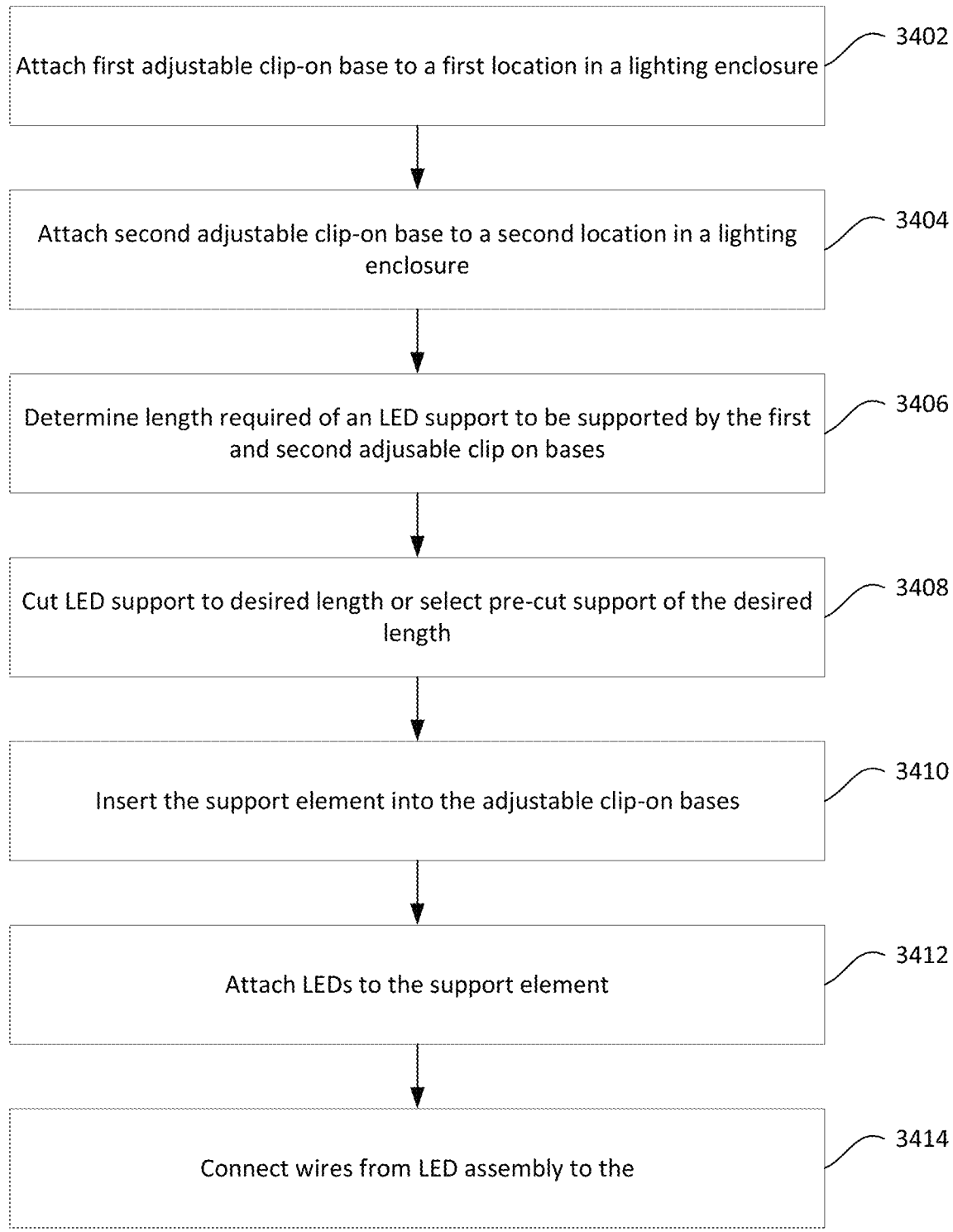
FIG. 34 shows a flowchart for a method employing adjustable clip-on bases for replacing fluorescent lightbulbs with LED lighting.

FIG. 34 shows a flowchart 3400 for a method of replacing fluorescent lights with LED lighting employing adjustable clip-on bases of embodiments.

In block 3402, a first adjustable clip-on base is attached to a first location in a lighting enclosure, such as at a fluorescent light fixture or at another desired mounting surface. Attachment may comprise inserting a fitting on an adjustable clip-on base into a complementary-shaped socket in the fluorescent light fixture. Attachment may comprise inserting a fitting on an adjustable clip-on base into hole (either pre-existing or newly-created) in a fluorescent light fixture on in another mounting surface. Attachment may comprise screwing, bolting, gluing, using adhesive tape, or otherwise attaching the adjustable clip-on base within a fluorescent light fixture or onto another mounting surface.

In block 3404, a second adjustable clip-on base is attached to a second location similarly to the options for attaching the first adjustable clip-on base. The second adjustable clip-on base may be attached using the same or a different option than was employed for attaching the first adjustable clip-on base. The second adjustable clip-on base may be attached to the second location in an opposing orientation to the first adjustable clip-on base and spaced apart a sufficient distance to allow for insertion of a support element onto which one or more LED mounting assemblies may be attached. One or both of the adjustable clip-on bases may include a spring to bias the assembly against the enclosure walls to maintain the assembly in position.

In block 3406, a required length for a support element is determined from the gap between the first and second adjustable clip-on bases once they have been attached to the lamp cabinet in blocks 3402 and 3404. Then in block 3408 a support element may be cut to approximately the required length or a pre-cut support element with the required length may be chosen. The cutting operation in block 3406 may be performed either after the operations in blocks 3402 and 3404, or before these operations. An advantage of the adjustable clip-on base is that if the support element is not cut to an exact length to fit between the two adjustable clip-on bases, the assembler will have the ability to adjust the position of the adjustable clip-on base to correct the shortened mistake in length.

In block 3410, the support element from block 3408 is clipped into the adjustable clip-on bases which were mounted in blocks 3402 and 3404.

In block 3412, one or more LED assemblies may be attached to the support element clipped into the adjustable clip-on bases in block 3410.

Finally, in block 3414, wiring from the LEDs comprised in the LED mounting assemblies may be connected to one or more LED drivers or LED power supplies.

The order of the steps described in the flowchart of FIG. 34 can be varied. For example, the adjustable clip-on bases can be attached to the LED support before the adjustable clip-on bases are mounted in the lighting enclosure. The LEDs may be attached to the LED support at any time during the process.

FIGS. 35A-35D show an adjustable clip-on base support 3502 positioned at different locations along an LED support 3504, for example, an aluminum tube. By positioning the adjustable clip-on base at different positions, the length of the assembly is changed. For example, if a LED support tube is cut short, then FIG. 35D shows that the adjustable-clip on base can be positioned to extend further out from the LED support, lengthening the assembly. An optional screw 3506 can assist the clip in holding the adjustable clip-on base onto the LED Support. If the LED support tube is cut to the maximum usable length, FIG. 35A shows that the adjustable clip-on base is positioned to minimize the length that it adds to the assembly. FIGS. 35B and 35C show intermediate positions in which the length of the assembly is increased to various degrees by the positioning of the adjustable clip-on base. FIG. 35E shows two adjustable clip-on bases attached at either end of the LED support tube. Each adjustable clip-on base can be positioned independently to vary the length of the assembly. Preferably each of the adjustable clip-on bases on the opposing ends overlap the LED support by the same amount, to provide equal mechanical strength on both ends.

The term "lighting enclosure" as used herein is not limited to any type of enclosure, and can apply to an open wall to which an LED assembly is attached. The adjustable clip-on base can be positioned along allows the LED support at positions to coincide with, for example, wall studs. The expression "fitting within the lighting enclosure" includes fitting directly into the lighting enclosure or fitting in fixtures attached to the lighting enclosure.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An adjustable clip-on base for installing an LED support into a lighting enclosure, comprising:
   a support clip portion for removably attaching the adjustable clip-on base onto the LED support, the support clip portion being attachable to the LED support over a range of positions; and
   a mating structure portion extending from the support clip, and including an insertion portion that inserts into corresponding mating structure portion in the lighting enclosure and a base plate to which the insertion portion is attached, the base plate being attached to the support clip portion, the support clip being re-positionable over the range of positions to alter the distance that the mating structure portion extends from the end of the LED support.

2. The adjustable clip-on base of claim 1, in which the mating structure portion is configured to mate with a fluorescent light fixture mounted in the lighting enclosure.

3. The adjustable clip-on base of claim 2, in which the mating structure portion comprises a bi-pin configuration.

4. The adjustable clip-on base of claim 2, in which the mating structure portion comprises a T-12 HO configuration.

5. The adjustable clip-on base of claim 1, in which the mating structure portion is configured to mate with a hole in the lighting enclosure.

6. An adjustable clip-on base for installing an LED support into a lighting enclosure, comprising:
- a support clip portion for removably attaching the adjustable clip-on base onto the LED support, the support clip portion being attachable to the LED support over a range of positions; and
- a mating structure portion extending from the support clip, the mating structure configured for mating with a hole in the lighting enclosure to mount the LED support into the lighting enclosure, the support clip being re-positionable over the range of positions to alter the distance that the mating structure portion extends from the end of the LED support
- in which the mating structure portion includes a spring for maintaining a portion of the mating structure portion against the lighting enclosure.

7. The adjustable clip-on base of claim 5 in which the mating structure portion is configured to mate with a "D"-shaped mounting bracket in the lighting enclosure.

8. The adjustable clip-on base of claim 5 in which the mating structure portion is configured to mate with a round hole in the lighting enclosure.

9. The adjustable clip-on base of claim 1 the further comprising at least one brace for strengthening the connection of the base plate to the support clip portion.

10. The adjustable clip-on base of claim 1 in which the support clip portion comprises a top portion and two jaws extending from the top portion, and in which the at least one brace extends from the top element to the backing portion.

11. The adjustable clip-on base of claim 10 in which the at least one brace extends from the exterior surface of the top element to the backing portion.

12. The adjustable clip-on base of claim 10 in which the at least one brace extends from the interior surface of the top element to the backing portion.

13. The adjustable clip-on base of claim 10 in which the at least one brace includes a first brace that extends from the interior surface of the top element to the backing portion and a second brace that extends from the external surface of the top element to the backing portion.

14. The adjustable clip-on base of claim 1 in which the backing portion has a maximum dimension that is greater than the width of the support clip portion.

15. The adjustable clip-on base of claim 1 in which the support clip portion comprises a top element and two jaws, the jaws including angled tabs on their distal end, the angled tabs facilitating insert and removal of a support element onto the support clip.

16. The adjustable clip-on base of claim 1 in which the support clip portion comprises a top element and two jaws, the jaws including inwardly projecting protrusions to prevent the LED support from sliding out from between jaws.

17. An adjustable clip-on base for installing an LED support into a lighting enclosure, comprising:
- a support clip portion for removably attaching the adjustable clip-on base onto the LED support, the support clip portion being attachable to the LED support over a range of positions; and
- a mating structure portion extending from the support clip, the mating structure configured for mating with the lighting enclosure to mount the LED support into the lighting enclosure, the support clip being re-positionable over the range of positions to alter the distance that the mating structure portion extends from the end of the LED support,
- in which the mating structure portion comprises a non-conducting material.

18. The adjustable clip-on base of claim 1, in which the support clip portion includes first and second jaws and in which the first and second jaws are angled slightly towards each other to create a gripping force on the LED support.

19. The adjustable clip-on base of claim 1, in which the support clip portion is operable to grip a support element having a rectangular, square, triangular, circular, I-shaped, oval, or hexagonal cross-sectional shape.

20. An LED assembly, comprising:
- an LED support; and
- two adjustable clip-bases in accordance with claim 1 attached to the LED support.

21. An LED assembly, comprising:
- an LED support; and
- two adjustable clip-bases in accordance with claim 6 attached to the LED support.

22. The adjustable clip-on base of claim 6, in which the support clip portion includes first and second jaws and in which the first and second jaws are angled slightly towards each other to create a gripping force on the support element.

* * * * *